(12) United States Patent
Ibrahim et al.

(10) Patent No.: US 8,811,468 B2
(45) Date of Patent: Aug. 19, 2014

(54) METHOD AND SYSTEM FOR FM INTERFERENCE DETECTION AND MITIGATION

(75) Inventors: Brima Ibrahim, Aliso Viejo, CA (US); Paul Lettieri, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 225 days.

(21) Appl. No.: 11/286,950

(22) Filed: Nov. 22, 2005

(65) Prior Publication Data

US 2006/0269021 A1 Nov. 30, 2006

Related U.S. Application Data

(60) Provisional application No. 60/685,239, filed on May 26, 2005.

(51) Int. Cl.
*H04B 1/66* (2006.01)

(52) U.S. Cl.
USPC ........... 375/240; 375/144; 375/148; 375/346; 375/E1.02; 379/416

(58) Field of Classification Search
USPC .......... 375/340, 281, 319, 322; 704/500; 330/51; 327/77, 100; 455/295, 303, 455/307; 607/5
See application file for complete search history.

(56) References Cited

U.S. PATENT DOCUMENTS

| | | | | |
|---|---|---|---|---|
| 3,605,018 A | * | 9/1971 | Coviello | 375/349 |
| 4,223,282 A | * | 9/1980 | de Boer | 332/183 |
| 4,498,195 A | * | 2/1985 | Ooi et al. | 455/205 |
| 4,561,114 A | * | 12/1985 | Kozono et al. | 455/226.4 |
| 4,569,085 A | * | 2/1986 | Nolde et al. | 455/208 |
| 4,792,768 A | * | 12/1988 | Fried et al. | 331/11 |
| 5,025,784 A | * | 6/1991 | Shao et al. | 607/5 |
| 5,119,391 A | * | 6/1992 | Maeda et al. | 372/32 |
| 5,212,828 A | * | 5/1993 | Hatashita et al. | 455/295 |
| 5,469,115 A | * | 11/1995 | Peterzell et al. | 330/129 |
| 5,666,275 A | * | 9/1997 | Inokuchi et al. | 363/35 |
| 5,757,858 A | * | 5/1998 | Black et al. | 375/295 |
| 5,821,898 A | * | 10/1998 | Eerola et al. | 342/357.12 |
| 5,912,926 A | * | 6/1999 | Koenck et al. | 375/295 |

(Continued)

OTHER PUBLICATIONS

Paul M. Embree, C++ Algorithms for Digital Signal Processing, 1999, Second Edition, pp. 391-395, 562-563.*

(Continued)

*Primary Examiner* — Adolf Dsouza
(74) *Attorney, Agent, or Firm* — McDermott Will & Emery LLP

(57) ABSTRACT

Methods and systems for processing signals are provided and may include removing a DC component from a signal envelope comprising a combined signal within a range of allocated FM channels to generate a modified signal envelope. Fluctuation in power in the signal envelope may be detected based on a ratio of a magnitude of the signal envelope and a magnitude of the modified signal envelope. The removing may further include low-pass filtering the signal envelope to generate a low-pass filtered signal envelope. A square values of the low-pass filtered signal envelope may be determined to generate a squared signal envelope. The squared signal envelope may be high-pass filtered to generate a high-pass filtered signal envelope. The fluctuation in power in the signal envelope may be detected based on a ratio of a magnitude of the high-pass filtered signal envelope and a magnitude of the low-pass filtered signal envelope.

27 Claims, 20 Drawing Sheets

(56) References Cited

U.S. PATENT DOCUMENTS

| | | | |
|---|---|---|---|
| 6,215,408 B1* | 4/2001 | Leonard et al. | 340/644 |
| 6,330,432 B1* | 12/2001 | Tong et al. | 455/226.3 |
| 6,356,519 B1* | 3/2002 | Wakuda et al. | 369/44.28 |
| 6,570,897 B1* | 5/2003 | Mizuyoshi | 372/43.01 |
| 6,603,962 B1* | 8/2003 | Tong et al. | 455/226.3 |
| 2001/0022736 A1* | 9/2001 | Suzuki | 363/69 |
| 2002/0030104 A1* | 3/2002 | Matsui et al. | 235/454 |
| 2002/0149824 A1* | 10/2002 | Beaulieu et al. | 359/158 |
| 2004/0201415 A1* | 10/2004 | Amano et al. | 329/31.5 |
| 2004/0204168 A1* | 10/2004 | Laurila | 455/569.1 |
| 2004/0224638 A1* | 11/2004 | Fadell et al. | 455/66.1 |
| 2005/0182983 A1* | 8/2005 | Gaskins et al. | 713/322 |
| 2005/0231375 A1* | 10/2005 | Kingston | 340/574 |
| 2005/0238362 A1* | 10/2005 | Sekiya et al. | 398/147 |
| 2005/0265498 A1* | 12/2005 | Gunzelmann et al. | 375/350 |
| 2006/0111119 A1* | 5/2006 | Iochi | 455/450 |

OTHER PUBLICATIONS

Husson. et al. (Co-channel interference measurement for TDMA radio mobile communication systems; IEEE Symposium on Communications and Vehicular Technology; Nov. 1994; pp. 194-198).*

* cited by examiner

METHOD AND SYSTEM FOR FM INTERFERENCE DETECTION AND MITIGATION

CROSS-REFERENCE TO RELATED APPLICATIONS/INCORPORATION BY REFERENCE

The application makes reference to, claims priority to, and claims the benefit of U.S. Provisional Application Ser. No. 60/685,239 filed on May 26, 2005.

This application also makes reference to:
U.S. application Ser. No. 11/176,417, filed on Jul. 7, 2005;
U.S. application Ser. No. 11/286,555, filed on even date herewith;
U.S. application Ser. No. 11/287,120, filed on even date herewith;
U.S. application Ser. No. 11/287,075, filed on even date herewith;
U.S. application Ser. No. 11/287,181, filed on even date herewith;
U.S. application Ser. No. 11/286,947, filed on even date herewith;
U.S. application Ser. No. 11/287,034, filed on even date herewith;
U.S. application Ser. No. 11/287,044, filed on even date herewith; and
U.S. application Ser. No. 11/286,844, filed on even date herewith.

Each of the above stated applications is hereby incorporated herein by reference in its entirety.

FIELD OF THE INVENTION

Certain embodiments of the invention relate to Bluetooth and FM communication. More specifically, certain embodiments of the invention relate to a method and system for FM interference detection and mitigation.

BACKGROUND OF THE INVENTION

With the popularity of portable electronic devices and wireless devices that support audio applications, there is a growing need to provide a simple and complete solution for audio communications applications. For example, some users may utilize Bluetooth-enabled devices, such as headphones and/or speakers, to allow them to communicate audio data with their wireless handset while freeing to perform other activities. Other users may have portable electronic devices that may enable them to play stored audio content and/or receive audio content via broadcast communication, for example.

However, integrating multiple audio communication technologies into a single device may be costly. Combining a plurality of different communication services into a portable electronic device or a wireless device may require separate processing hardware and/or separate processing software. Moreover, coordinating the reception and/or transmission of data to and/or from the portable electronic device or a wireless device may require significant processing overhead that may impose certain operation restrictions and/or design challenges. For example, a handheld device such as a cellphone that incorporates Bluetooth and Wireless LAN may pose certain coexistence problems caused by the close proximity of the Bluetooth and WLAN transceivers. Furthermore, simultaneous use of a plurality of radios in a handheld may result in significant increases in power consumption. Power being a precious commodity in most wireless mobile devices, combining devices such as a cellular radio, a Bluetooth radio and a WLAN radio requires careful design and implementation in order to minimize battery usage. Additional overhead such as sophisticated power monitoring and power management techniques are required in order to maximize battery life.

A portable electronic device or a wireless device may be adapted to receive audio content via broadcast communication. When the portable electronic device or the wireless device is tuning to a signal, the received signal may be a combined signal, which may include one or more interfering signals. In this regard, the presence of an interfering signal may make it difficult to distinguish between a desired signal and the interfering signal.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for FM interference detection and mitigation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for FM interference detection and mitigation. Aspects of the method and system may comprise removing a DC component from a signal envelope comprising a combined signal within a range of allocated FM channels to generate a modified signal envelope. Fluctuation in power in the signal envelope may be detected based on a ratio of a magnitude of the signal envelope and a magnitude of the modified signal envelope. The removing may further include low-pass filtering the signal envelope to generate a low-pass filtered signal envelope. A square value of the low-pass filtered signal envelope may be determined to generate a squared signal envelope. The squared signal envelope may be high-pass filtered to generate a high-pass filtered signal envelope. The fluctuation in power in the signal envelope may be detected based on a ratio of a magnitude of the high-pass filtered signal envelope and a magnitude of the low-pass filtered signal envelope.

In another aspect of the invention, signal strength of the high-pass filtered signal envelope and signal strength of the squared signal envelope may be determined. The fluctuation in power in the signal envelope may be determined based on a ratio of the signal strength of the high-pass filtered signal envelope and the signal strength of the squared signal envelope. The ratio of the magnitude of the signal envelope and the magnitude of the modified signal envelope may be utilized for determining whether the signal envelope comprises an interference signal.

Figure 1A:
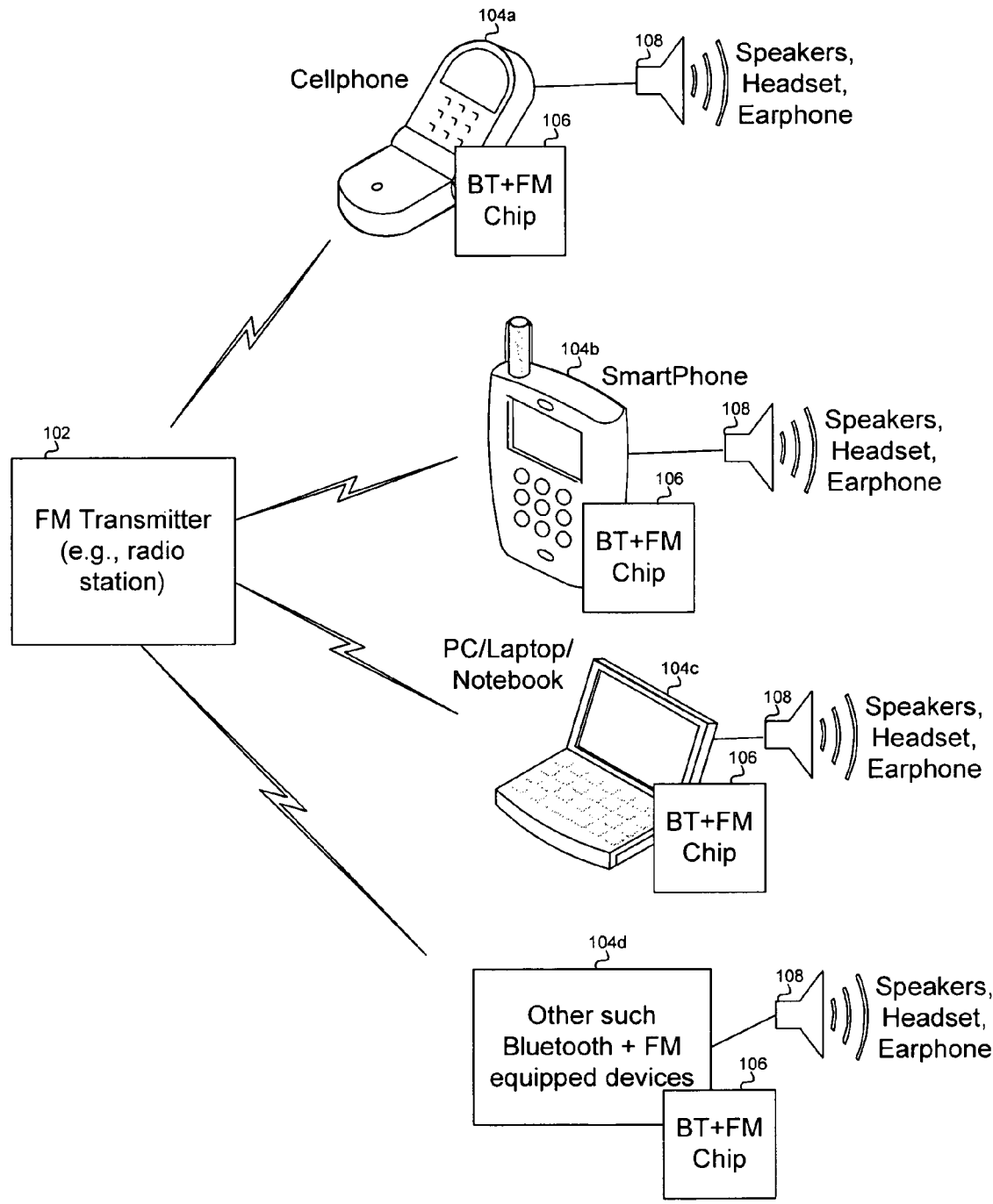
FIG. 1A is a block diagram of an exemplary FM transmitter that communicates with handheld devices that utilize a single chip with integrated Bluetooth and FM radios, in accordance with an embodiment of the invention.

FIG. 1A is a block diagram of an exemplary FM transmitter that communicates with handheld devices that utilize a single chip with integrated Bluetooth and FM radios, in accordance with an embodiment of the invention. Referring to FIG. 1A, there is shown an FM transmitter 102, a cellular phone 104a, a smart phone 104b, a computer 104c, and an exemplary FM and Bluetooth-equipped device 104d. The FM transmitter 102 may be implemented as part of a radio station or other broadcasting device, for example. Each of the cellular phone 104a, the smart phone 104b, the computer 104c, and the exemplary FM and Bluetooth-equipped device 104d may comprise a single chip 106 with integrated Bluetooth and FM radios for supporting FM and Bluetooth data communications. The FM transmitter 102 may enable communication of FM audio data to the devices shown in FIG. 1A by utilizing the single chip 106. Each of the devices in FIG. 1A may comprise and/or may be communicatively coupled to a listening device 108 such as a speaker, a headset, or an earphone, for example.

The cellular phone 104a may be enabled to receive an FM transmission signal from the FM transmitter 102. The user of the cellular phone 104a may then listen to the transmission via the listening device 108. The cellular phone 104a may comprise a "one-touch" programming feature that enables pulling up specifically desired broadcasts, like weather, sports, stock quotes, or news, for example. The smart phone 104b may be enabled to receive an FM transmission signal from the FM transmitter 102. The user of the smart phone 104b may then listen to the transmission via the listening device 108.

The computer 104c may be a desktop, laptop, notebook, tablet, and a PDA, for example. The computer 104c may be enabled to receive an FM transmission signal from the FM transmitter 102. The user of the computer 104c may then listen to the transmission via the listening device 108. The computer 104c may comprise software menus that configure listening options and enable quick access to favorite options, for example. In one embodiment of the invention, the computer 104c may utilize an atomic clock FM signal for precise timing applications, such as scientific applications, for example. While a cellular phone, a smart phone, computing devices, and other devices have been shown in FIG. 1A, the single chip 106 may be utilized in a plurality of other devices and/or systems that receive and use Bluetooth and/or FM signals. In one embodiment of the invention, the single chip Bluetooth and FM radio may be utilized in a system comprising a WLAN radio. U.S. application Ser. No. 11/286,844, filed on even date herewith, discloses a method and system comprising a single chip Bluetooth and FM radio integrated with a wireless LAN radio, and is hereby incorporated herein by reference in its entirety.

Figure 1B:
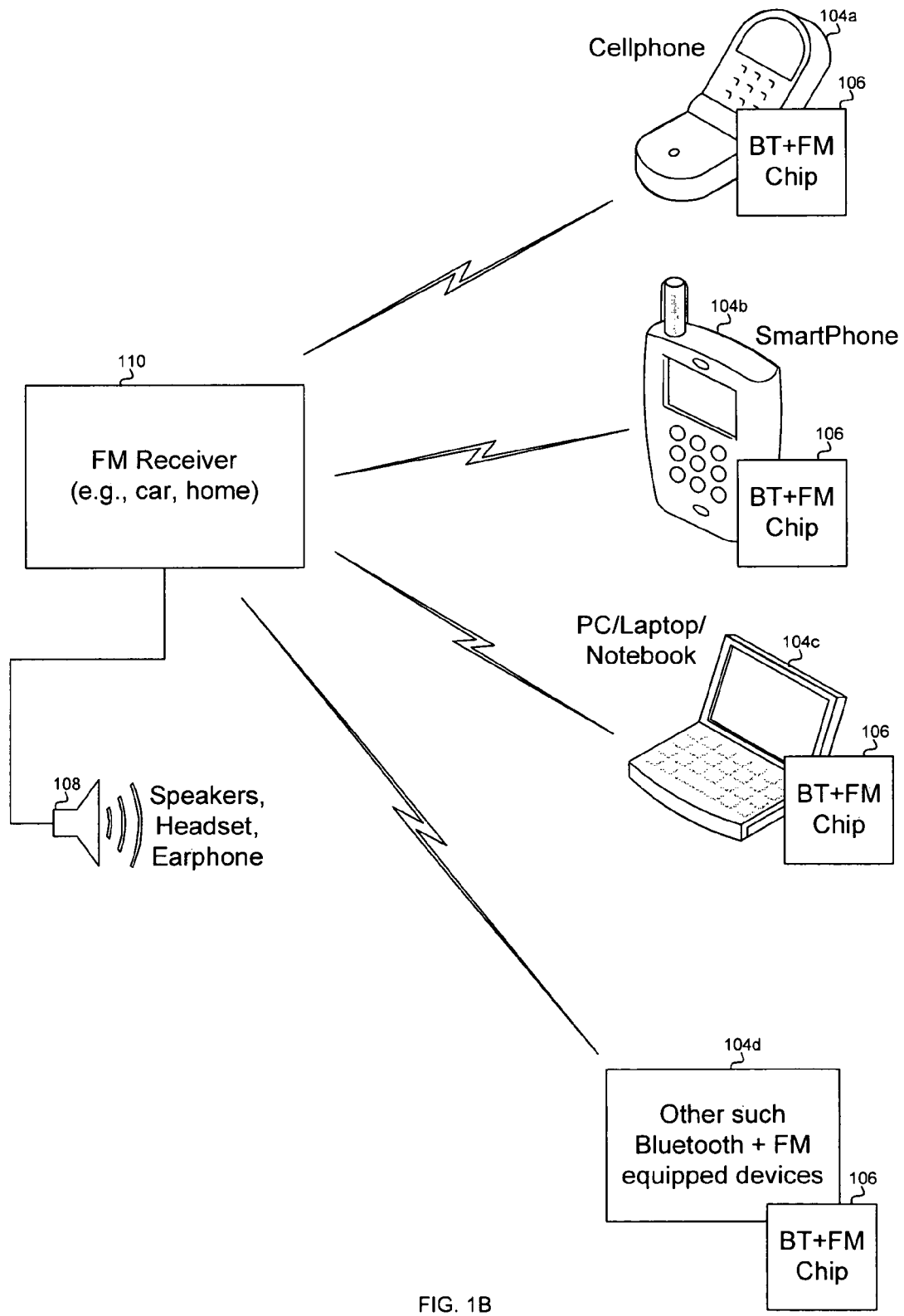
FIG. 1B is a block diagram of an exemplary FM receiver that communicates with handheld devices that utilize a single chip with integrated Bluetooth and FM radios, in accordance with an embodiment of the invention.

FIG. 1B is a block diagram of an exemplary FM receiver that communicates with handheld devices that utilize a single chip with integrated Bluetooth and FM radios, in accordance with an embodiment of the invention. Referring to FIG. 1B, there is shown an FM receiver 110, the cellular phone 104a, the smart phone 104b, the computer 104c, and the exemplary FM and Bluetooth-equipped device 104d. In this regard, the FM receiver 110 may comprise and/or may be communicatively coupled to a listening device 108. A device equipped with the Bluetooth and FM transceivers, such as the single chip 106, may be able to broadcast its respective signal to a "deadband" of an FM receiver for use by the associated audio system. For example, a cellphone or a smart phone, such as the cellular phone 104a and the smart phone 104b, may transmit a telephone call for listening over the audio system of an automobile, via usage of a deadband area of the car's FM stereo system. One advantage may be the universal ability to use this feature with all automobiles equipped simply with an FM radio with few, if any, other external FM transmission devices or connections being required.

In an exemplary embodiment of the invention, the FM receiver 110 may be adapted to provide FM interference detection and mitigation. The FM receiver 110 may receive a signal envelope or a combined signal, which may comprise an on frequency signal, or a desired signal and an interfering signal. In this regard, the FM receiver 110 may be enabled to detect fluctuation in power in the signal envelope by removing a DC component from the signal envelope and comparing the original signal envelope to the modified signal envelope. The FM receiver 110 may be enabled to determine whether the received signal envelope comprises an interfering signal, based on the detected fluctuation in power.

In another example, a computer, such as the computer 104c, may comprise an MP3 player or another digital music format player and may broadcast a signal to the deadband of an FM receiver in a home stereo system. The music on the computer may then be listened to on a standard FM receiver with few, if any, other external FM transmission devices or connections. While a cellular phone, a smart phone, and computing devices have been shown, a single chip that combines a Bluetooth and FM transceiver and/or receiver may be utilized in a plurality of other devices and/or systems that receive and use an FM signal.

Figure 1C:
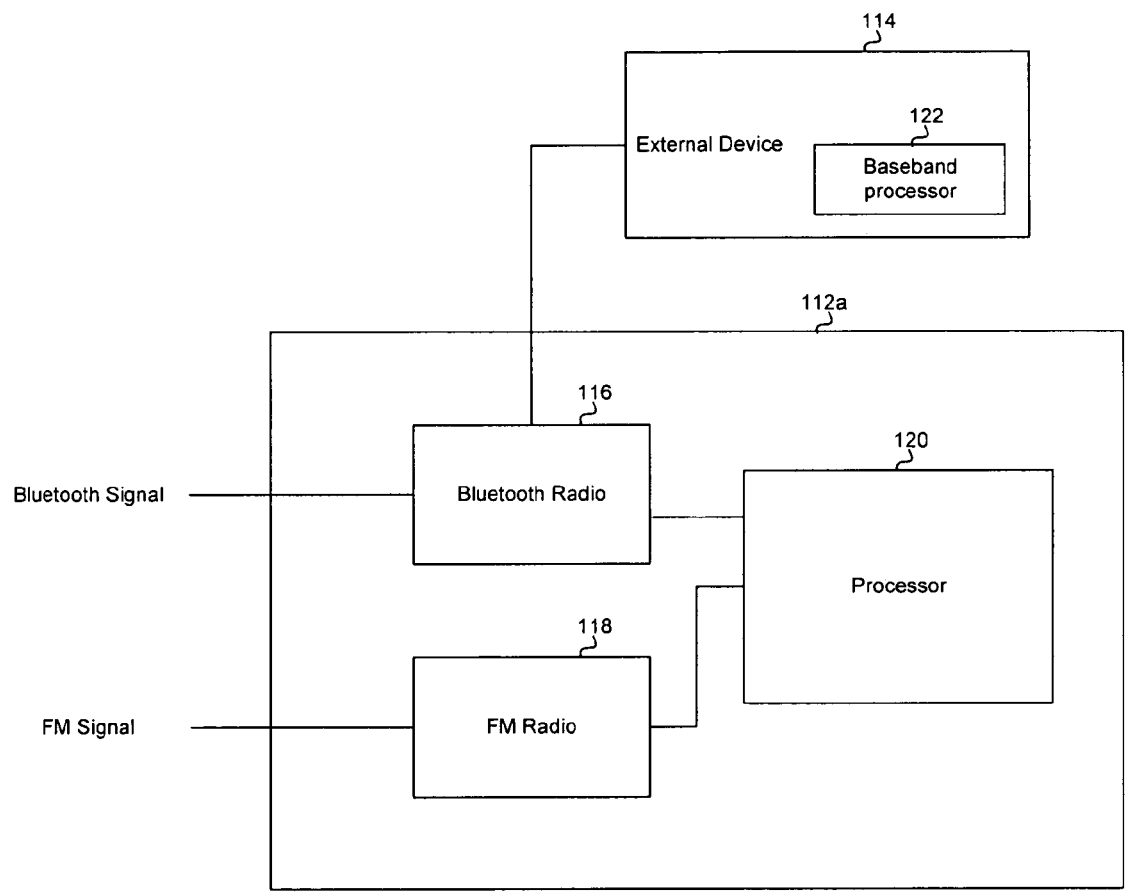
FIG. 1C is a block diagram of an exemplary single chip with integrated Bluetooth and FM radios that supports FM processing and an external device that supports Bluetooth processing, in accordance with an embodiment of the invention.

FIG. 1C is a block diagram of an exemplary single chip with integrated Bluetooth and FM radios that supports FM processing and an external device that supports Bluetooth processing, in accordance with an embodiment of the invention. Referring to FIG. 1C, there is shown a single chip 112a that supports Bluetooth and FM radio operations and an external device 114. The single chip 112a may comprise an integrated Bluetooth radio 116, an integrated FM radio 118, and an integrated processor 120. The Bluetooth radio 116 may comprise suitable logic, circuitry, and/or code that enable Bluetooth signal communication via the single chip 112a. In this regard, the Bluetooth radio 116 may support audio signals or communication. The FM radio may comprise suitable logic, circuitry, and/or code that enable FM signal communication via the single chip 112a.

The integrated processor 120 may comprise suitable logic, circuitry, and/or code that may enable processing of the FM data received by the FM radio 118. Moreover, the integrated processor 120 may enable processing of FM data to be transmitted by the FM radio 118 when the FM radio 118 comprises transmission capabilities. The external device 114 may comprise a baseband processor 122. The baseband processor 122 may comprise suitable logic, circuitry, and/or code that may enable processing of Bluetooth data received by the Bluetooth radio 116. Moreover, the baseband processor 122 may enable processing of Bluetooth data to be transmitted by the Bluetooth radio 116. In this regard, the Bluetooth radio 116 may communicate with the baseband processor 122 via the external device 114. The Bluetooth radio 116 may communicate with the integrated processor 120.

In an exemplary embodiment of the invention, the FM radio 118 may comprise an FM receiver, which may be adapted to provide FM interference detection and mitigation. The FM receiver may receive a signal envelope or a combined signal, which may comprise an on frequency signal, or a desired signal and an interfering signal. In this regard, the FM receiver may be enabled to detect fluctuation in power in the signal envelope by removing a DC component from the signal envelope and comparing the original signal envelope to the modified signal envelope. The FM receiver may be enabled to determine whether the received signal envelope comprises an interfering signal, based on the detected fluctuation in power.

Figure 1D:
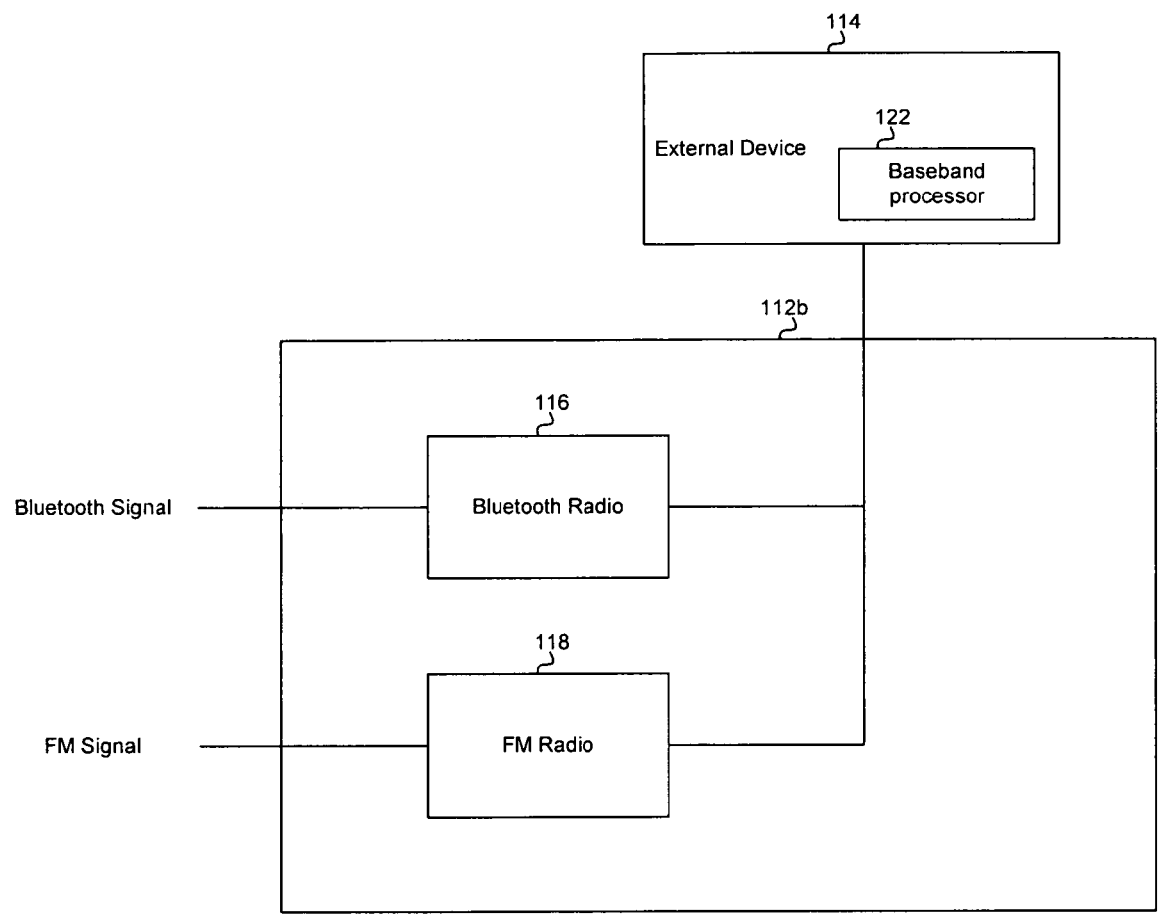
FIG. 1D is a block diagram of an exemplary single chip with integrated Bluetooth and FM radios and an external device that supports Bluetooth and FM processing, in accordance with an embodiment of the invention.

FIG. 1D is a block diagram of an exemplary single chip with integrated Bluetooth and FM radios and an external device that supports Bluetooth and FM processing, in accordance with an embodiment of the invention. Referring to FIG. 1D, there is shown a single chip 112b that supports Bluetooth and FM radio operations and an external device 114. The single chip 112b may comprise the Bluetooth radio 116 and the FM radio 118. The Bluetooth radio 116 and/or the FM radio 118 may be integrated into the single chip 112b. The external device 114 may comprise a baseband processor 122. The baseband processor 122 may comprise suitable logic, circuitry, and/or code that may enable processing of Bluetooth data received by the Bluetooth radio 116 and/or processing of Bluetooth data to be transmitted by the Bluetooth radio 116. In this regard, the Bluetooth radio 116 may communicate with the baseband processor 122 via the external device 114. Moreover, the baseband processor 122 may comprise suitable logic, circuitry, and/or code that may enable processing of the FM data received by the FM radio 118. The baseband processor 122 may enable processing FM data to be transmitted by the FM radio 118 when the FM radio 118 comprises transmission capabilities. In this regard, the FM radio 118 may communicate with the baseband processor 122 via the external device 114.

Figure 1E:
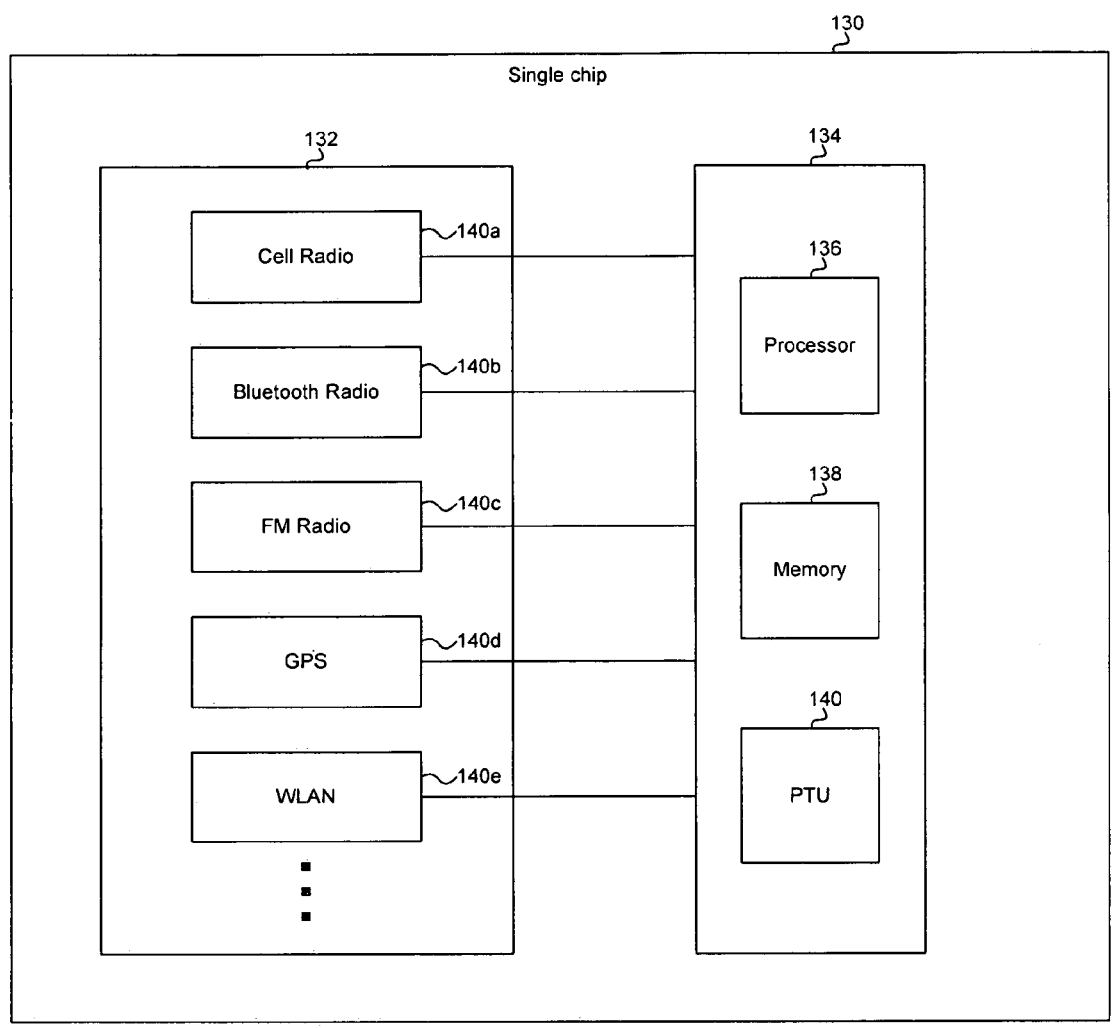
FIG. 1E is a block diagram of an exemplary single chip with multiple integrated radios that supports radio data processing, in accordance with an embodiment of the invention.

FIG. 1E is a block diagram of an exemplary single chip with multiple integrated radios that supports radio data processing, in accordance with an embodiment of the invention. Referring to FIG. 1E, there is shown a single chip 130 that may comprise a radio portion 132 and a processing portion 134. The radio portion 132 may comprise a plurality of integrated radios. For example, the radio portion 132 may comprise a cell radio 140a that supports cellular communications, a Bluetooth radio 140b that supports Bluetooth communications, an FM radio 140c that supports FM communications, a global positioning system (GPS) 140d that supports GPS communications, and/or a wireless local area network (WLAN) 140e that supports communications based on the IEEE 802.11 standards. The FM radio 140c may be similar to the FM radio 118 in FIG. 1C and may provide the FM interference detection and mitigation functionalities as described herein.

The processing portion 134 may comprise at least one processor 136, a memory 138, and a peripheral transport unit (PTU) 140. The processor 136 may comprise suitable logic, circuitry, and/or code that enable processing of data received from the radio portion 132. In this regard, each of the integrated radios may communicate with the processing portion 134. In some instances, the integrated radios may communicate with the processing portion 134 via a common bus, for example. The memory 138 may comprise suitable logic, circuitry, and/or code that enable storage of data that may be utilized by the processor 136. In this regard, the memory 138 may store at least a portion of the data received by at least one of the integrated radios in the radio portion 132. Moreover, the memory 138 may store at least a portion of the data that may be transmitted by at least one of the integrated radios in the radio portion 132. The PTU 140 may comprise suitable logic, circuitry, and/or code that may enable interfacing data in the single chip 130 with other devices that may be communicatively coupled to the single chip 130. In this regard, the PTU 140 may support analog and/or digital interfaces.

Figure 1F:
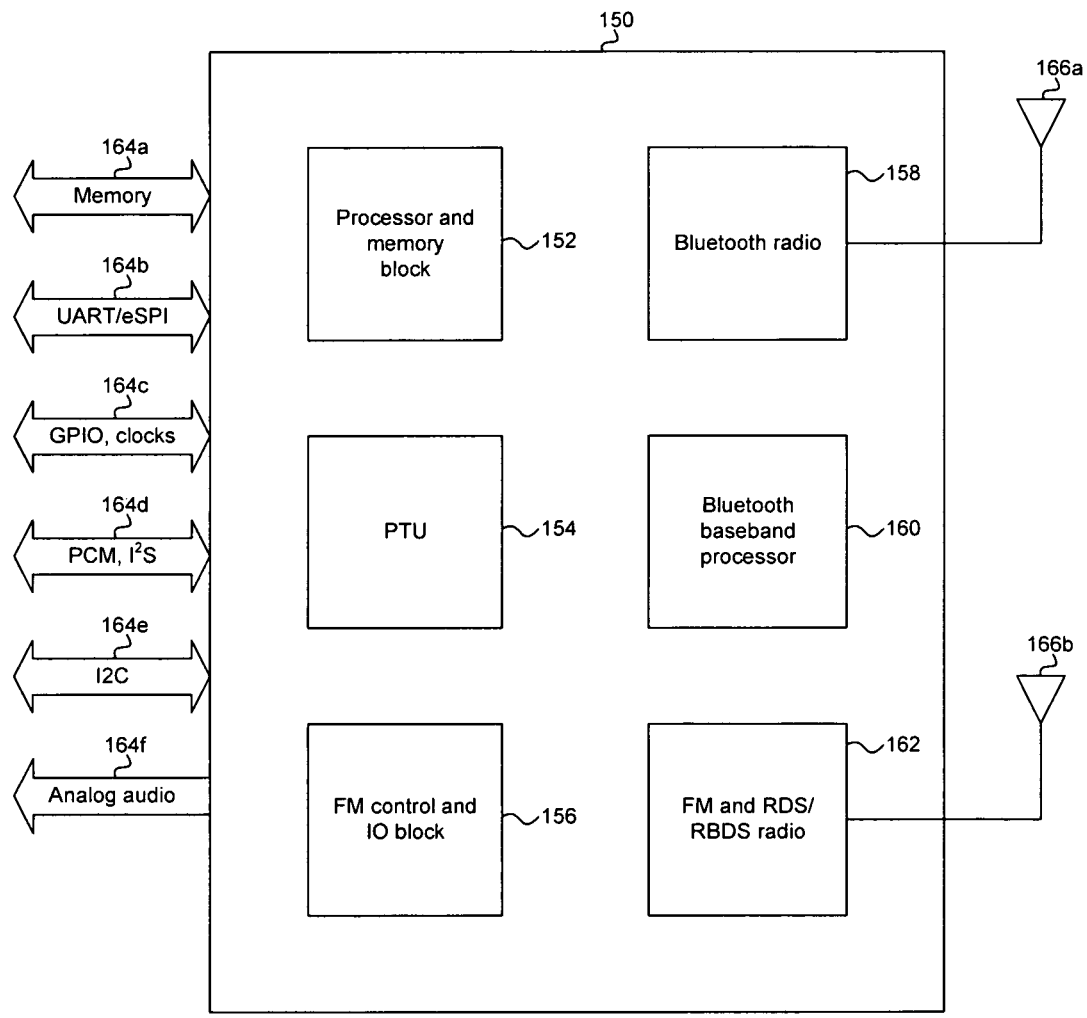
FIG. 1F is a block diagram of an exemplary single chip with integrated Bluetooth and FM radios that supports multiple interfaces, in accordance with an embodiment of the invention.

FIG. 1F is a block diagram of an exemplary single chip with integrated Bluetooth and FM radios that supports multiple interfaces, in accordance with an embodiment of the invention. Referring to FIG. 1F, there is shown a single chip 150 that supports Bluetooth and FM radio communications. The single chip 150 may comprise a processor and memory block 152, a PTU 154, an FM control and input-output (IO) block 156, a Bluetooth radio 158, a Bluetooth baseband processor 160, and an FM and radio data system (RDS) and radio broadcast data system (RDBS) radio 162. A first antenna or antenna system 166*a* may be communicatively coupled to the Bluetooth radio 158. A second antenna or antenna system 166*b* may be communicatively coupled to the FM and RDS/RBDS radio 162. The FM and RDS/RBDS radio 162 may comprise an FM receiver, which may provide FM interference detection, and mitigation functionalities as described herein.

The processor and memory block 152 may comprise suitable logic, circuitry, and/or code that may enable control, management, data processing operations, and/or data storage operations, for example. The PTU 154 may comprise suitable logic, circuitry, and/or code that may enable interfacing the single chip 150 with external devices. The FM control and IO block 156 may comprise suitable logic, circuitry, and/or code that may enable control of at least a portion of the FM and RDS/RBDS radio 162. The Bluetooth radio 158 may comprise suitable logic, circuitry, and/or code that may enable Bluetooth communications via the first antenna 166*a*. The FM and RDS/RBDS radio 162 may comprise suitable logic, circuitry, and/or code that may enable FM, RDS, and/or RBDS data communication via the second antenna 166*b*. The Bluetooth baseband processor 160 may comprise suitable logic, circuitry, and/or code that may enable processing of baseband data received from the Bluetooth radio 158 or baseband data to be transmitted by the Bluetooth radio 158.

The PTU 154 may support a plurality of interfaces. For example, the PTU 154 may support an external memory interface 164*a*, a universal asynchronous receiver transmitter (UART) and/or enhanced serial peripheral interface (eSPI) interface 164*b*, a general purpose input/output (GPIO) and/or clocks interface 164*c*, a pulse-code modulation (PCM) and/or an inter-IC sound ($I^2S$) interface 164*d*, an inter-integrated circuit ($I^2C$) bus interface 164*e*, and/or an audio interface 164*f*.

Figure 1G:
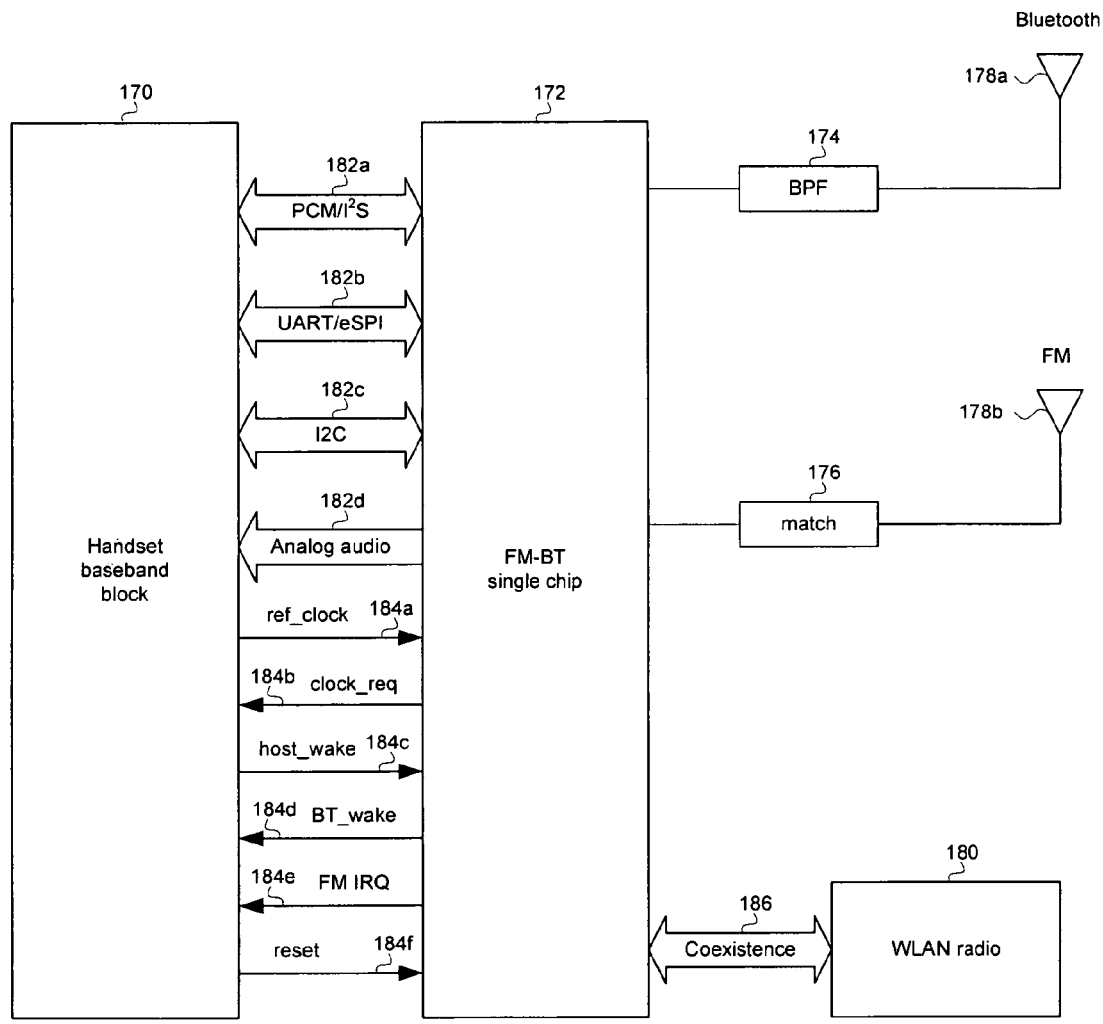
FIG. 1G is a block diagram of an exemplary single chip with integrated Bluetooth and FM radios that supports interfacing with a handset baseband device and a coexistent wireless LAN (WLAN) radio, in accordance with an embodiment of the invention.

FIG. 1G is a block diagram of an exemplary single chip with integrated Bluetooth and FM radios that supports interfacing with a handset baseband device and a coexistent wireless LAN (WLAN) radio, in accordance with an embodiment of the invention. Referring to FIG. 1G, there is shown a single chip 172, a handset baseband block 170, a band pass filter 174, a first antenna or antenna system 178*a*, a matching circuit 176, a second antenna or antenna filter 178*b*, and a WLAN radio 180. The single chip 172 may be substantially similar to the single chip 150. In this instance, the single chip 172 may comprise suitable logic, circuitry, and/or code that may enable coexistent operation with the WLAN radio 180 via the coexistence interface 186.

The single chip 172 may communicate Bluetooth data via the BPF 174 and the first antenna 178*a*. The single chip 172 may also communicate FM data via the matching circuit 176 and the second antenna 178*b*. The single chip 172 may coordinate Bluetooth data communication in the presence of WLAN channels by communicating with the WLAN radio 180 via the coexistence interface 186. The single chip 172 may comprise an FM receiver, which may provide FM interference detection and mitigation functionalities as described herein.

The single chip 172 may transfer data to the handset baseband block 170 via at least one interface, such as a PCM/I2S interface 182*a*, a UART/eSPI interface 182*b*, a $I^2C$ interface 182*c*, and/or and analog audio interface 182*d*. The single chip 172 and the handset baseband block 170 may also communicate via at least one control signal. For example, the handset baseband block 170 may generate a clock signal, ref_clock, 184*a*, a wake signal, host_wake 184*c*, and/or a reset signal 184*f* that may be transferred to the single chip 172. Similarly, the single chip 172 may generate a clock request signal, clock_req, 184*b*, a Bluetooth wake signal, BT_wake, 184*d*, and/or an FM interrupt request signal, FM IRQ, 184*e* that may be transferred to the handset baseband block 170. The handset baseband block 170 may comprise suitable logic, circuitry, and/or code that may enable processing of at least a portion of the data received from the single chip 172 and/or data to be transferred to the single chip 172. In this regard, the handset baseband block 170 may transfer data to the single chip 172 via at least one interface.

Figure 2A:
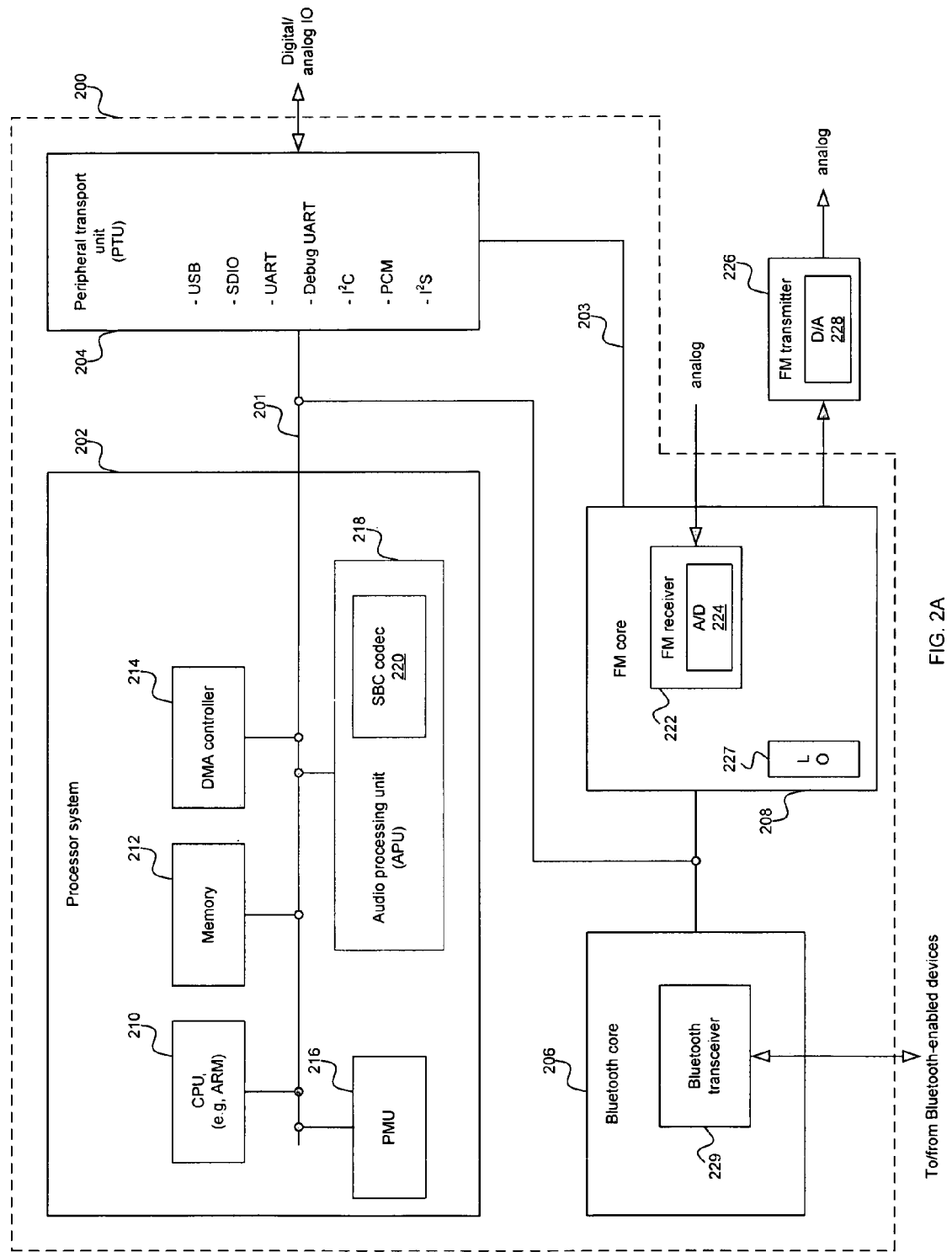
FIG. 2A is a block diagram of an exemplary single chip that supports Bluetooth and FM operations with an external FM transmitter, in accordance with an embodiment of the invention.

FIG. 2A is a block diagram of an exemplary single chip that supports Bluetooth and FM operations with an external FM transmitter, in accordance with an embodiment of the invention. Referring to FIG. 2A, there is shown a single chip 200 that may comprise a processor system 202, a peripheral transport unit (PTU) 204, a Bluetooth core 206, a frequency modulation (FM) core 208, and a common bus 201. An FM transmitter 226 may be an external device to the single chip 200 and may be communicatively coupled to the single chip 200 via the FM core 208, for example. The FM transmitter 226 may be a separate integrated circuit (IC), for example.

The processor system 202 may comprise a central processing unit (CPU) 210, a memory 212, a direct memory access (DMA) controller 214, a power management unit (PMU) 216, and an audio processing unit (APU) 218. The APU 218 may comprise a subband coding (SBC) codec 220. At least a portion of the components of the processor system 202 may be communicatively coupled via the common bus 201.

The CPU 210 may comprise suitable logic, circuitry, and/ or code that may enable control and/or management operations in the single chip 200. In this regard, the CPU 210 may communicate control and/or management operations to the Bluetooth core 206, the FM core 208, and/or the PTU 204 via a set of register locations specified in a memory map. Moreover, the CPU 210 may be utilized to process data received by the single chip 200 and/or to process data to be transmitted by the single chip 200. The CPU 210 may enable processing of data received via the Bluetooth core 206, via the FM core 208, and/or via the PTU 204. For example, the CPU 210 may enable processing of A2DP data and may then transfer the processed A2DP data to other components of the single chip 200 via the common bus 201. In this regard, the CPU may utilize the SBC codec 220 in the APU 218 to encode and/or decode A2DP data, for example. The CPU 210 may enable processing of data to be transmitted via Bluetooth core 206, via the FM core 208, and/or via the PTU 204. The CPU 210 may be, for example, an ARM processor or another embedded processor core that may be utilized in the implementation of system-on-chip (SOC) architectures.

The CPU 210 may time multiplex Bluetooth data processing operations and FM data processing operations. In this regard, the CPU 210 may perform each operation by utilizing a native clock, that is, Bluetooth data processing based on a Bluetooth clock and FM data processing based on an FM clock. The Bluetooth clock and the FM clock may be distinct and may not interact. The CPU 210 may gate the FM clock and the Bluetooth clock and may select the appropriate clock in accordance with the time multiplexing scheduling or arrangement. When he CPU 210 switches between Bluetooth operations and FM operations, at least certain states associated with the Bluetooth operations or with the FM operations may be retained until the CPU 210 switches back.

For example, in the case where the Bluetooth function is not active and is not expected to be active for some time, the CPU 210 may run on a clock derived from the FM core 208. This may eliminate the need to bring in a separate high-speed clock when one is already available in the FM core 208. In the case where the Bluetooth core 206 may be active, for example when the Bluetooth is in a power-saving mode that requires it to be active periodically, the processor may chose to use a clock derived separately from the FM core 208. The clock may be derived directly from a crystal or oscillator input to the Bluetooth core 206, or from a phase locked loop (PLL) in the Bluetooth core 206. While this clocking scheme may provide certain flexibility in the processing operations performed by the CPU 210 in the single chip 200, other clocking schemes may also be implemented.

The CPU 210 may also enable configuration of data routes to and/or from the FM core 208. For example, the CPU 210 may configure the FM core 208 so that data may be routed via an I²S interface or a PCM interface in the PTU 204 to the analog ports communicatively coupled to the PTU 204.

The CPU 210 may enable tuning, such as flexible tuning, and/or searching operations in Bluetooth and/or FM communication by controlling at least a portion of the Bluetooth core 206 and/or the FM core 208. For example, the CPU 210 may generate at least one signal that tunes the FM core 208 to a certain frequency to determine whether there is a station at that frequency. When a station is found, the CPU 210 may configure a path for the audio signal to be processed in the single chip 200. When a station is not found, the CPU 210 may generate at least one additional signal that tunes the FM core 208 to a different frequency to determine whether a station may be found at the new frequency.

Searching algorithms may enable the FM core 208 to scan up or down in frequency from a presently tuned channel and stop on the next channel with received signal strength indicator (RSSI) above a threshold. The search algorithm may be able to distinguish image channels. The choice of the IF frequency during search is such that an image channel may have a nominal frequency error of 50 kHz, which may be used to distinguish the image channel from the "on" channel. The search algorithm may also be able to determine if a high side or a low side injection provides better receive performance, thereby allowing for a signal quality metric to be developed for this purpose. One possibility to be investigated is monitoring the high frequency RSSI relative to the total RSSI. The IF may be chosen so that with the timing accuracy that a receiver may be enabled to provide, the image channels may comprise a frequency error that is sufficiently large to differentiate the image channels from the on channel.

The CPU 210 may enable a host controller interface (HCI) in Bluetooth. In this regard, the HCI provides a command interface to the baseband controller and link manager, and access to hardware status and control registers. The HCI may provide a method of accessing the Bluetooth baseband capabilities that may be supported by the CPU 210.

The memory 212 may comprise suitable logic, circuitry, and/or code that may enable data storage. In this regard, the memory 212 may be utilized to store data that may be utilized by the processor system 202 to control and/or manage the operations of the single chip 200. The memory 212 may also be utilized to store data received by the single chip 200 via the PTU 204 and/or via the FM core 208. Similarly, the memory 212 may be utilized to store data to be transmitted by the single chip 200 via the PTU 204 and/or via the FM core 208. The DMA controller 214 may comprise suitable logic, circuitry, and/or code that may enable transfer of data directly to and from the memory 212 via the common bus 201 without involving the operations of the CPU 210.

The PTU 204 may comprise suitable logic, circuitry, and/or code that may enable communication to and from the single chip 200 via a plurality of communication interfaces. In some instances, the PTU 204 may be implemented outside the single chip 200, for example. The PTU 204 may support analog and/or digital communication with at least one port. For example, the PTU 204 may support at least one universal series bus (USB) interface that may be utilized for Bluetooth data communication, at least one secure digital input/output (SDIO) interface that may also be utilized for Bluetooth data communication, at least one universal asynchronous receiver transmitter (UART) interface that may also be utilized for Bluetooth data communication, and at least one I²C bus interface that may be utilized for FM control and/or FM and RDS/RBDS data communication. The PTU 204 may also support at least one PCM interface that may be utilized for Bluetooth data communication and/or FM data communication, for example.

The PTU 204 may also support at least one inter-IC sound (I²S) interface, for example. The I²S interface may be utilized to send high fidelity FM digital signals to the CPU 210 for processing, for example. In this regard, the I²S interface in the PTU 204 may receive data from the FM core 208 via a bus 203, for example. Moreover, the I²S interface may be utilized to transfer high fidelity audio in Bluetooth. For example, in the A2DP specification there is support for wideband speech that utilizes 16 kHz of audio. In this regard, the I²S interface may be utilized for Bluetooth high fidelity data communication and/or FM high fidelity data communication. The I²S interface may be a bidirectional interface and may be utilized to support bidirectional communication between the PTU 204 and the FM core 208 via the bus 203. The I²S interface may be utilized to send and receive FM data from external devices such as coder/decoders (CODECs) and/or other devices that may further process the I²S data for transmission, such as local transmission to speakers and/or headsets and/or remote transmission over a cellular network, for example.

The Bluetooth core 206 may comprise suitable logic, circuitry, and/or code that may enable reception and/or transmission of Bluetooth data. The Bluetooth core 206 may comprise a Bluetooth transceiver 229 that may perform reception and/or transmission of Bluetooth data. In this regard, the Bluetooth core 206 may support amplification, filtering, modulation, and/or demodulation operations, for example. The Bluetooth core 206 may enable data to be transferred from and/or to the processor system 202, the PTU 204, and/or the FM core 208 via the common bus 201, for example.

The FM core 208 may comprise suitable logic, circuitry, and/or code that may enable reception and/or transmission of FM data. The FM core 208 may comprise an FM receiver 222 and a local oscillator (LO) 227. The FM receiver 222 may comprise an analog-to-digital (A/D) converter 224. The FM receiver 222 may support amplification, filtering, and/or demodulation operations, for example. The LO 227 may be utilized to generate a reference signal that may be utilized by the FM core 208 for performing analog and/or digital operations. The FM core 206 may enable data to be transferred from and/or to the processor system 202, the PTU 204, and/or the Bluetooth core 206 via the common bus 201, for example.

Moreover, the FM core 208 may receive analog FM data via the FM receiver 222. The FM receiver 222 may provide FM interference detection and mitigation functionalities as described herein.

The A/D converter 224 in the FM receiver 222 may be utilized to convert the analog FM data to digital FM data to enable processing by the FM core 208. The FM core 208 may also enable the transfer of digital FM data to the FM transmitter 226. The FM transmitter 226 may comprise a digital-to-analog (D/A) converter 228 that may be utilized to convert digital FM data to analog FM data to enable transmission by the FM transmitter 226. Data received by the FM core 208 may be routed out of the FM core 208 in digital format via the common bus 201 and/or in analog format via the bus 203 to the $I^2S$ interface in the PTU 204, for example.

The FM core 208 may enable radio transmission and/or reception at various frequencies, such as, 400 MHz, 900 MHz, 2.4 GHz and/or 5.8 GHz, for example. The FM core 208 may also support operations at the standard FM band comprising a range of about 76 MHz to 108 MHz, for example.

The FM core 208 may also enable reception of RDS data and/or RBDS data for in-vehicle radio receivers. In this regard, the FM core 208 may enable filtering, amplification, and/or demodulation of the received RDS/RBDS data. The RDS/RBDS data may comprise, for example, a traffic message channel (TMC) that provides traffic information that may be communicated and/or displayed to an in-vehicle user.

Digital circuitry within the FM core 208 may be operated based on a clock signal generated by dividing down a signal generated by the LO 227. The LO 227 may be programmable in accordance with the various channels that may be received by the FM core 208 and the divide ratio may be varied in order to maintain the digital clock signal close to a nominal value.

The RDS/RBDS data may be buffered in the memory 212 in the processor system 202. The RDS/RBDS data may be transferred from the memory 212 via the $I^2C$ interface when the CPU 210 is in a sleep or stand-by mode. For example, the FM core 208 may post RDS data into a buffer in the memory 212 until a certain level is reached and an interrupt is generated to wake up the CPU 210 to process the RDS/RBDS data. When the CPU 210 is not in a sleep mode, the RDS data may be transferred to the memory 212 via the common bus 201, for example.

Moreover, the RDS/RBDS data received via the FM core 208 may be transferred to any of the ports communicatively coupled to the PTU 204 via the HCI scheme supported by the single chip 200, for example. The RDS/RBDS data may also be transferred to the Bluetooth core 206 for communication to Bluetooth-enabled devices.

In one exemplary embodiment of the invention, the single chip 200 may receive FM audio data via the FM core 208 and may transfer the received data to the Bluetooth core 206 via the common bus 201. The Bluetooth core 206 may transfer the data to the processor system 202 to be processed. In this regard, the SBC codec 220 in the APU 218 may perform SBC coding or other A2DP compliant audio coding for transportation of the FM data over a Bluetooth A2DP link. The processor system 202 may also enable performing continuous variable slope delta (CVSD) modulation, log pulse code modulation (Log PCM), and/or other Bluetooth compliant voice coding for transportation of FM data on Bluetooth synchronous connection-oriented (SCO) or extended SCO (eSCO) links. The Bluetooth-encoded FM audio data may be transferred to the Bluetooth core 206, from which it may be communicated to another device that supports the Bluetooth protocol. The CPU 210 may be utilized to control and/or manage the various data transfers and/or data processing operations in the single chip 200 to support the transmission of FM audio data via the Bluetooth protocol.

Moreover, when Bluetooth data is received, such as A2DP, SCO, eSCO, and/or MP3, for example, the Bluetooth core 206 may transfer the received data to the processor system 202 via the common bus 201. At the processor system 202, the SBC codec 220 may decode the Bluetooth data and may transfer the decoded data to the FM core 208 via the common bus 201. The FM core 208 may transfer the data to the FM transmitter 226 for communication to an FM receiver in another device.

In another exemplary embodiment of the invention, the single chip 200 may operate in a plurality of modes. For example, the single chip 200 may operate in one of an FM-only mode, a Bluetooth-only mode, and an FM-Bluetooth mode. For the FM-only mode, the single chip 200 may operate with a lower power active state than in the Bluetooth-only mode or the FM-Bluetooth mode because FM operation in certain devices may have a limited source of power. In this regard, during the FM-only mode, at least a portion of the operation of the Bluetooth core 206 may be disabled to reduce the amount of power used by the single chip 200. Moreover, at least a portion of the processor system 202, such as the CPU 210, for example, may operate based on a divided down clock from a phase locked-loop (PLL) in the FM core 208. In this regard, the PLL in the FM core 208 may utilize the LO 227, for example.

Moreover, because the code necessary to perform certain FM operations, such as tuning and/or searching, for example, may only require the execution of a few instructions in between time intervals of, for example, 10 ms, the CPU 210 may be placed on a stand-by or sleep mode to reduce power consumption until the next set of instructions is to be executed. In this regard, each set of instructions in the FM operations code may be referred to as a fragment or atomic sequence. The fragments may be selected or partitioned in a very structured manner to optimize the power consumption of the single chip 200 during FM-only mode operation. In some instances, fragmentation may also be implemented in the FM-Bluetooth mode to enable the CPU 210 to provide more processing power to Bluetooth operations when the FM core 208 is carrying out tuning and/or searching operations, for example.

Figure 2B:
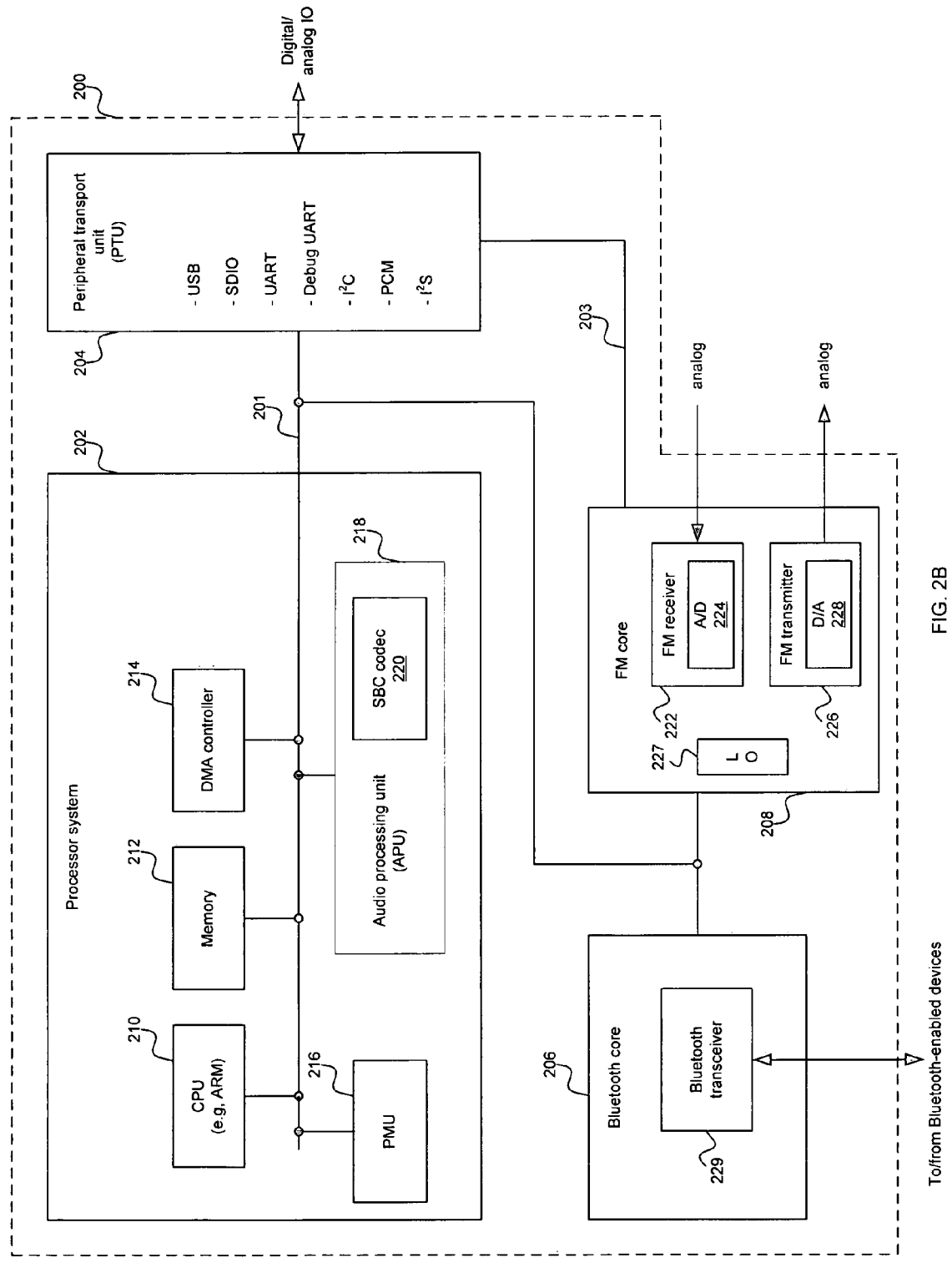
FIG. 2B is a block diagram of an exemplary single chip that supports Bluetooth and FM operations with an integrated FM transmitter, in accordance with an embodiment of the invention.

FIG. 2B is a block diagram of an exemplary single chip that supports Bluetooth and FM operations with an integrated FM transmitter, in accordance with an embodiment of the invention. Referring to FIG. 2B, there is shown the single chip 200 as described in FIG. 2A with the FM transmitter 226 integrated into the FM core 208. In this regard, the FM core 208 may support FM reception and/or transmission of FM data. The FM transmitter 226 may utilize signals generated based on the reference signal generated by the LO 227. The FM core 208 may enable transmission of data received via the PTU 204 and/or the Bluetooth core 206, for example. The exemplary implementation of the single chip 200 as described in FIG. 2B may support FM reception and/or transmission and Bluetooth reception and/or transmission.

Figure 2C:
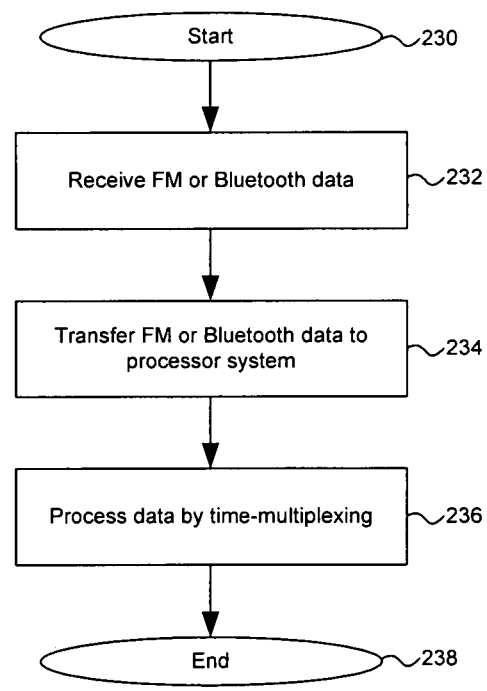
FIG. 2C is a flow diagram that illustrates exemplary steps for processing received data in a single chip with integrated Bluetooth and FM radios, in accordance with an embodiment of the invention.

FIG. 2C is a flow diagram that illustrates exemplary steps for processing received data in a single chip with integrated Bluetooth and FM radios, in accordance with an embodiment of the invention. Referring to FIGS. 2A and 2C, in step 232, after start step 230, the FM core 208 or the Bluetooth core 206 may receive data. For example, the FM core 208 may receive FM data via the FM receiver 222 and the Bluetooth core 206 may receive Bluetooth data via the Bluetooth transceiver 229. In step 234, the received data may be transferred to the processor system 202 via the common bus 201 for processing. The received data may be transferred to the memory 212 by the DMA controller 214, for example. In some instances, the processor system 202 may then transfer the data to the PTU 204, for example. The received data may be transferred to the processing system 202 in accordance with the time multiplexing schedule or arrangement provided by the processing system 202. In step 236, the processor system 202 may time multiplex the processing of FM data and the processing of Bluetooth data. For example, when Bluetooth data is being processed, FM data may not be transferred to the processing system 202 or may be transferred and stored in the memory 212 until FM processing is enabled. When the processing system 202 has completed processing the Bluetooth data, the FM data may be transferred to the processing system 202 for FM processing. Similarly, when FM data is being processed, Bluetooth data may not be transferred to the processing system 202 or may be transferred and stored in the memory 212 until Bluetooth processing is enabled. When the processing system 202 has completed processing the FM data, the Bluetooth data may be transferred to the processing system 202 for Bluetooth processing. After step 236, the process may proceed to end step 238.

Figure 2D:
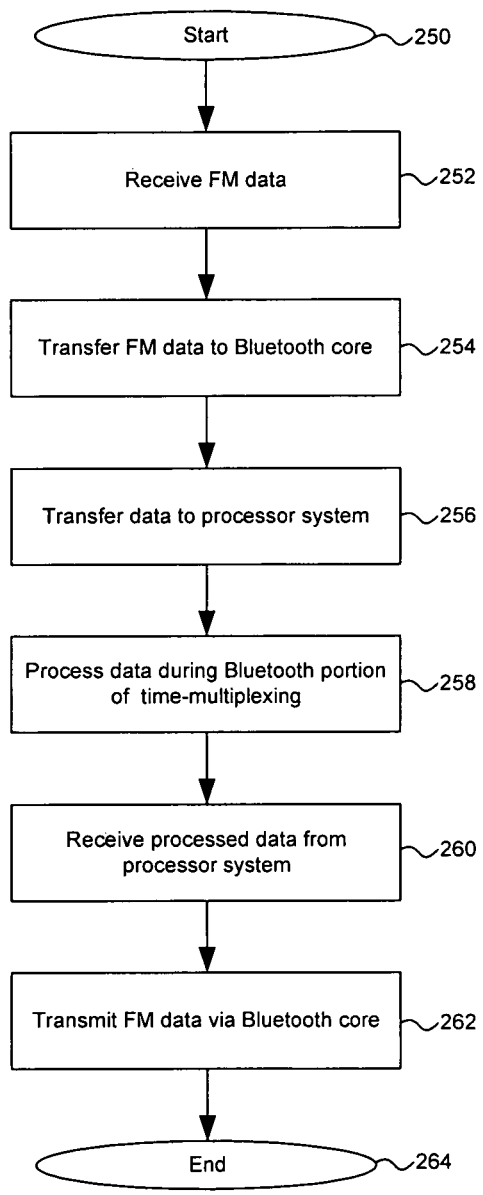
FIG. 2D is a flow diagram that illustrates exemplary steps for processing FM data via the Bluetooth core in a single chip with integrated Bluetooth and FM radios, in accordance with an embodiment of the invention.

FIG. 2D is a flow diagram that illustrates exemplary steps for processing FM data via the Bluetooth core in a single chip with integrated Bluetooth and FM radios, in accordance with an embodiment of the invention. Referring to FIGS. 2A and 2D, after start step 250, in step 252, the FM core 208 may receive FM data via the FM receiver 222. In step 254, the FM core 208 may transfer the FM data to the Bluetooth core 206 via the common bus 201. In step 256, the Bluetooth core 206 may transfer the FM data received from the FM core 208 to the processor system 202 via the common bus 201. In step 258, the processor system 202 may perform Bluetooth processing operations, such as encoding for example, to the FM data received from the Bluetooth core 206. In step 260, the Bluetooth core 206 may receive the processed FM data. In step 262, the Bluetooth core 206 may transfer the processed FM data to at least one Bluetooth-enable device via the Bluetooth transceiver 229.

An illustrative instance where the exemplary steps described in FIG. 2D may occur is when a handset is enabled to receive FM data and the handset may be enabled to operate with a Bluetooth headset. In this regard, the handset may receive the FM audio signal via the FM core 208 and may process the received signal for transfer to the headset via the Bluetooth core 206.

Figure 2E:
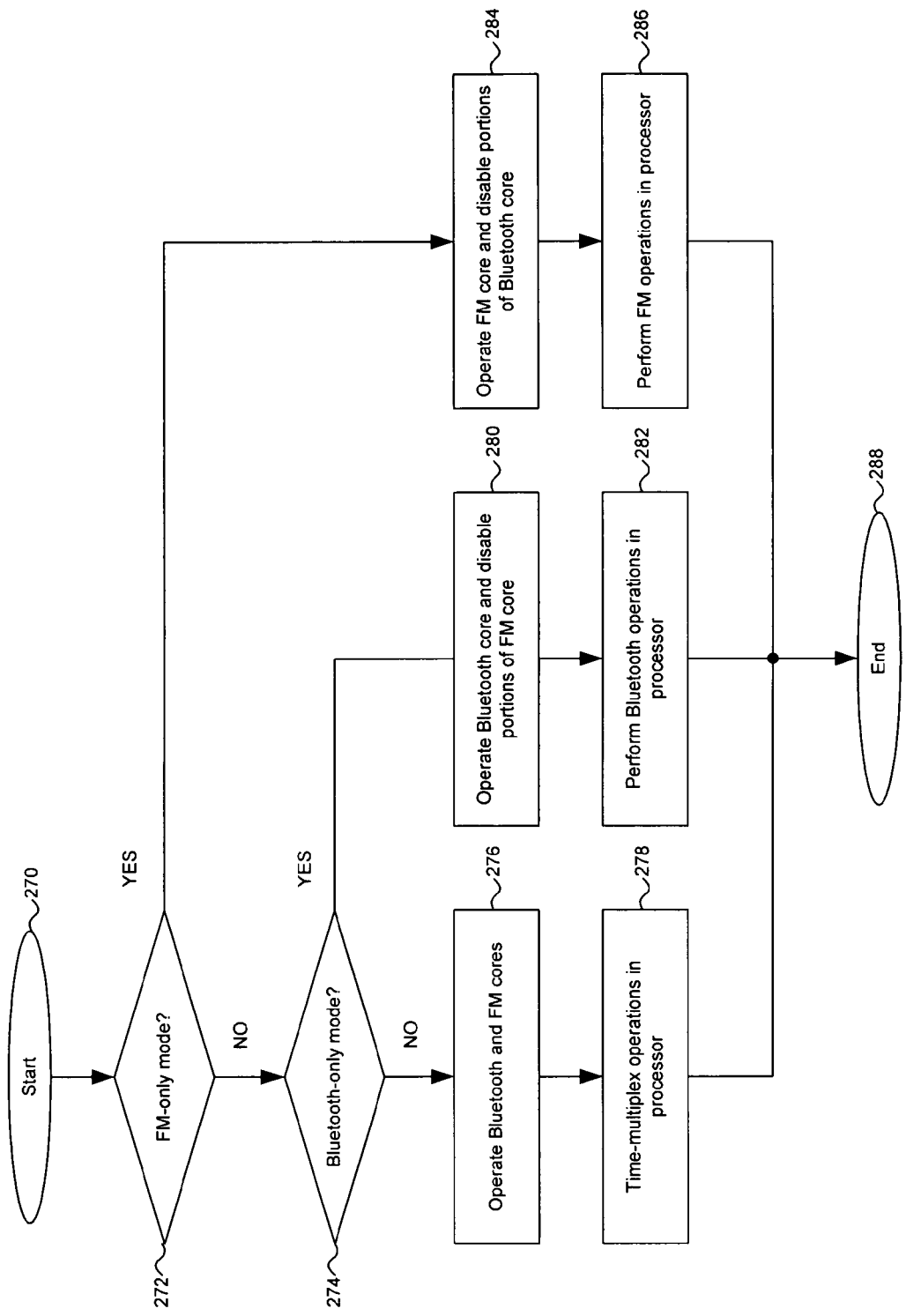
FIG. 2E is a flow diagram that illustrates exemplary steps for configuring a single chip with integrated Bluetooth and FM radios based on the mode of operation, in accordance with an embodiment of the invention.

FIG. 2E is a flow diagram that illustrates exemplary steps for configuring a single chip with integrated Bluetooth and FM radios based on the mode of operation, in accordance with an embodiment of the invention. Referring to FIG. 2E, after start step 270, in step 272, when a single chip with integrated Bluetooth and FM radios operates in an FM-only mode, the process may proceed to step 284. In step 284, the FM core 208 may be configured for operation and at least portions of the Bluetooth core 206 may be disabled. In step 286, FM data received and/or FM data to be transmitted may be processed in the processor system 202 without need for time multiplexing.

Returning to step 272, when the single chip is not operating in the FM-only mode, the process may proceed to step 274. In step 274, when the single chip is operating in the Bluetooth-only mode, the process may proceed to step 280. In step 280, the Bluetooth core 206 may be configured for operation and at least portions of the FM core 208 may be disabled. In step 282, Bluetooth data received and/or Bluetooth data to be transmitted may be processed in the processor system 202 without need for time multiplexing.

Returning to step 274, when the single chip is not operating in the Bluetooth-only mode, the process may proceed to step 276. In step 276, the Bluetooth core 206 and the FM core 208 may be configured for operation. In step 278, Bluetooth data and/or FM data may be processed in the processor system 202 in accordance with time multiplexing schedule or arrangement.

Figure 3:
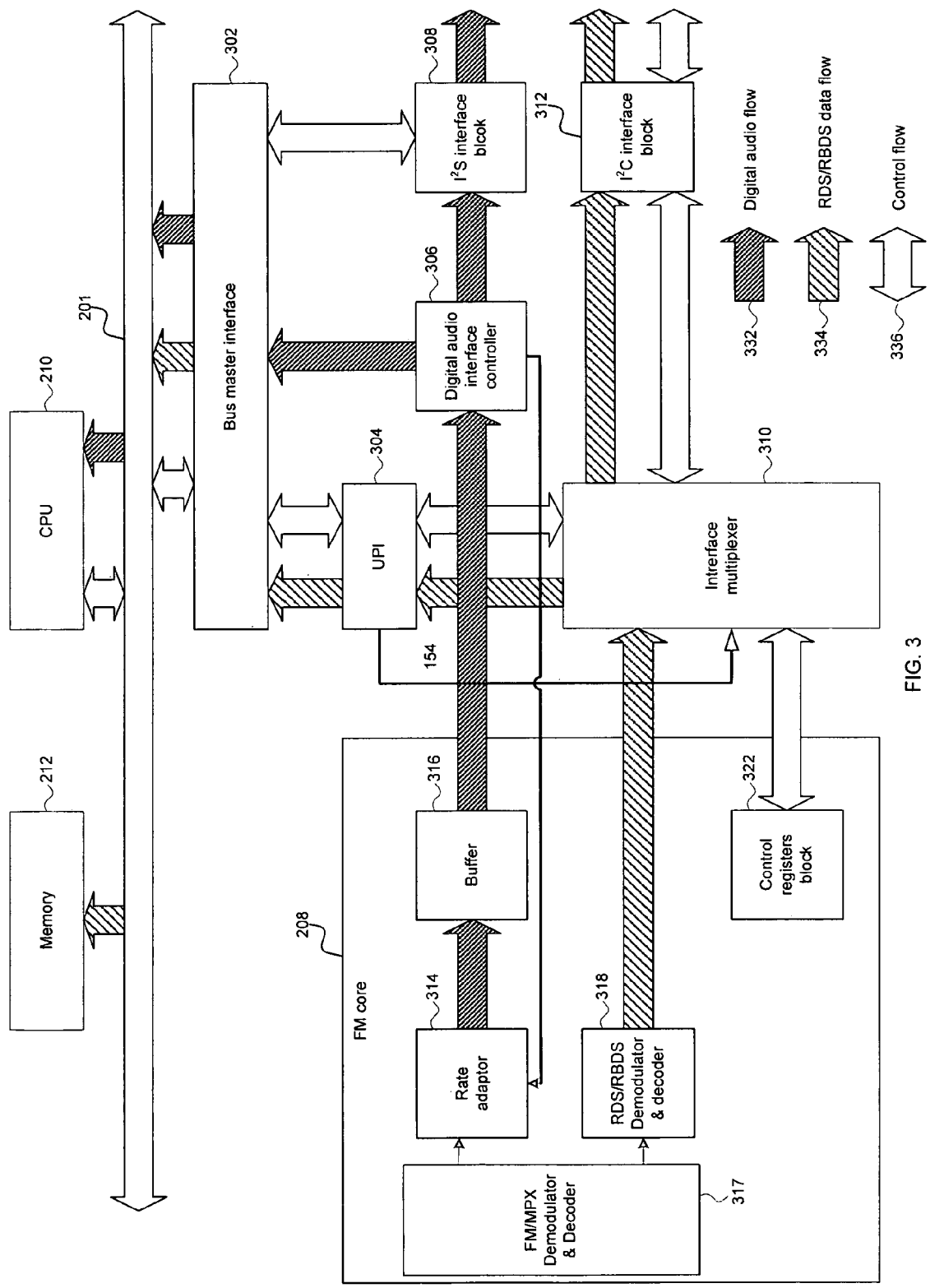
FIG. 3 is a block diagram of an exemplary FM core and PTU for processing RDS and digital audio data, in accordance with an embodiment of the invention.

FIG. 3 is a block diagram of an exemplary FM core and PTU for processing RDS and digital audio data, in accordance with an embodiment of the invention. Referring to FIG. 3, there is shown a more detailed portion of the single chip 200 described in FIGS. 2A-2B. The portion of the single chip 200 shown in FIG. 3 comprises the FM core 208, the memory 212, the CPU 210, and the common bus 201. Also shown are portions of the PTU 204 comprising an interface multiplexer 310, a universal peripheral interface (UPI) 304, a bus master interface 302, a digital audio interface controller 306, an $I^2S$ interface block 308, and an $I^2C$ interface block 312. The FM core 208 may comprise an FM/MPX demodulator and decoder 317, a rate adaptor 314, a buffer 316, an RDS/RBDS demodulator and decoder 318, and a control registers block 322. Narrowly spaced hashed arrows as illustrated by the flow arrow 332 show the flow of digital audio data. Broadly spaced hashed arrows as illustrated by the flow arrow 334 show the flow of RDS/RBDS data. Clear or blank arrows, as illustrated by the dual flow arrow 336, show the flow of control data.

The FM/MPX demodulator and decoder 317 may comprise suitable logic, circuitry, and/or code that may enable processing of FM and/or FM MPX stereo audio, for example. The FM/MPX demodulator and decoder 317 may demodulate and/or decode audio signals that may be transferred to the rate adaptor 314. The FM/MPX demodulator and decoder 317 may demodulate and/or decode signals that may be transferred to the RDS/RBDS demodulator and decoder 318. The rate adaptor 314 may comprise suitable logic, circuitry, and/or code that may enable controlling the rate of the FM data received from the FM/MPX demodulator and decoder 317. The rate adaptor 314 may comprise suitable logic, circuitry, and/or code that may enable controlling the rate of the FM data received by the FM core 208. The rate adaptor 314 may adapt the output sampling rate of the audio paths to the sampling clock of the host device or the rate of a remote device when a digital audio interface is used to transport the FM data. An initial rough estimate of the adaptation fractional change may be made and the estimate may then refined by monitoring the ratio of reading and writing rates and/or by monitoring the level of the audio samples in the output buffer. The rate may be adjusted in a feedback manner such that the level of the output buffer is maintained. The rate adaptor 314 may receive a strobe or pull signal from the digital audio interface controller 306, for example. Audio FM data from the rate adaptor 314 may be transferred to the buffer 316.

The buffer 316 may comprise suitable logic, circuitry, and/or code that may enable storage of digital audio data. The buffer 316 may receive a strobe or pull signal from the digital audio interface controller 306, for example. The buffer 316 may transfer digital audio data to the digital audio interface controller 306. The digital audio interface controller 306 may comprise suitable logic, circuitry, and/or code that may enable the transfer of digital audio data to the bus master interface 302 and/or the $I^2S$ interface block 308. The $I^2S$ interface 308 may comprise suitable logic, circuitry, and/or code that may enable transfer of the digital audio data to at least one device communicatively coupled to the single chip. The I²S interface 308 may communicate control data with the bus master interface 302.

The RDS/RBDS decoder 318 may comprise suitable logic, circuitry, and/or code that may enable processing of RDS/RBDS data received by the FM core 208. The RDS/RBDS demodulator and decoder 318 may comprise suitable logic, circuitry, and/or code that may enable processing of RDS/RBDS data from the FM/MPX demodulator and decoder 317. The RDS/RBDS demodulator and decoder 318 may provide further demodulation and/or decoding to data received from the FM/MPX demodulator and decoder 317. The output of the RDS/RBDS decoder 318 may be transferred to the interface multiplexer 310. The interface multiplexer 310 may comprise suitable logic, circuitry, and/or code that may enable the transfer of RDS/RBDS data to the UPI 304 and/or the I²C interface block 312. In this regard, the UPI 304 may generate a signal that indicates to the interface multiplexer 310 the interface to select. The I²C interface 312 may comprise suitable logic, circuitry, and/or code that may enable transfer of the RDS/RBDS data to at least one device communicatively coupled to the single chip. The I²C interface 312 may also communicate control data between external devices to the single chip and the interface multiplexer 310. In this regard, the interface multiplexer 310 may communicate control data between the I²C interface 312, the UPI 304, and/or the control registers block 322 in the FM core 208. The control registers block 322 may comprise suitable logic, circuitry, and/or code that may enable the storage of register information that may be utilized to control and/or configure the operation of at least portions of the FM core 208.

The UPI 304 may comprise suitable logic, circuitry, and/or code that may enable the transfer of digital audio data to the bus master interface 302 from the interface multiplexer 310. The UPI 304 may also enable the communication of control data between the bus master interface 302 and the interface multiplexer 310. The bus master interface 302 may comprise suitable logic, circuitry, and/or code that may enable communication of control data, digital audio data, and/or RDS/RBDS data between the portions of the PTU 204 shown in FIG. 3 and the common bus 201. The bus master interface 302 may transfer digital audio data and/or RDS/RBDS data to the common bus 201. The RDS/RBDS data may be transferred to the memory 212, for example. In some instances, the RDS/RBDS data may be transferred to the memory 212 when the CPU 210 is in a stand-by or sleep mode. The bus master interface 302 may push RDS/RBDS data into a buffer in the memory 212 or may pull RDS/RBDS data from a buffer in the memory 212, for example. The digital audio data may be transferred to the CPU 210 for processing, for example. The CPU 210 may generate and/or receive control data that may be communicated with the PTU 204 and/or the FM core 208 via the common bus 201.

In one embodiment of the invention, the single chip with integrated FM and Bluetooth radios may implement a search algorithm that collects and stores data during scanning of the FM band. The single chip may determine whether there is music or speech in a detected channel. Moreover, the single chip may enable searching and finding 10 of the strongest stations, for example, and may rank them.

In another embodiment of the invention, the single chip with integrated FM and Bluetooth radios may implement a search algorithm where the searches may be done based on specific criteria such as type of station or type of music, for example. The single chip may characterize each of the stations found based on the search.

In another embodiment of the invention, the single chip with integrated FM and Bluetooth radios may enable turning OFF a voltage regulator to the FM radio when in BT-only mode or turning OFF voltage regulators to the Bluetooth radio and the FM radio when both Bluetooth and FM are not being used, for example. In another embodiment of the invention, the single chip with integrated FM and Bluetooth radios may enable extending the battery life in a handheld device by requiring that the single chip does not consume power until configured by the host. Moreover, there may not be a load on the system until the chip is powered down and/or the chip may not draw any current when powered down.

In another embodiment of the invention, the single chip with integrated FM and Bluetooth radios may enable a digital filter that may combine de-emphasis, bass, and/or treble. The digital filter may have a programmable audio bandwidth, for example. In another embodiment of the invention, the single chip with integrated FM and Bluetooth radios may enable a power amplifier dynamical bypass for Class 1 systems. In another embodiment of the invention, the single chip with integrated FM and Bluetooth radios may enable an antenna with an adjustable center frequency.

In another embodiment of the invention, the single chip with integrated FM and Bluetooth radios may enable Bluetooth coexistence with WLAN. In this regard, coexistence may be supported when radiation of energy is not greater than a certain threshold. In some cases, such threshold may be 90 dBm, for example. The coexistence may be implemented to minimize the amount of energy that flows from the Bluetooth radio to the WLAN radio, for example. In this regard, the single chip may utilize a guilty-by-association technique in order to identify WLAN interfering channels in the vicinity of a Bluetooth device. Because WLAN channels may deteriorate very rapidly in the presence of Bluetooth communication, the guilty-by-association technique may enable a fast determination or identification of which adaptive frequency hopping (AFH) channels to block in order to limit the effect of Bluetooth communication on WLAN channels. Channel measurement statistics may be collected in 'bins' of N MHz each where N=2, 3, 4, etc and condemn the entire bin as bad if any K of the channels in the bin was measured as bad. An example may be when K=1. Condemnation of the entire bin as bad, that is, guilty-by-association, may increase both the reliability as well as speed with a WLAN channels of contiguous 20~22 MHz that may be blocked out in the AFH channel map. The use of techniques that modify the AFH channel map need not be limited to instances when a Bluetooth radio and an FM radio are integrated into a single chip. Modification of the AFH channel map may be applied to instances when Bluetooth applications are in coexistent operation with WLAN applications.

The WLAN interfering channels may be detected by utilizing channel measurement statistics such as received signal strength indicator (RSSI) energy measurements and/or packet error rate (PER) measurements. PER measurements may include missing a packet due to synchronization errors, cyclic redundancy check (CRC) errors in decoding the header, and/or CRC errors in decoding the payload, for example. These measurements may be performed during the Bluetooth frame duration (1.25 ms) on the current Bluetooth channel or on channels different from the current Bluetooth channel.

In another embodiment of the invention, the single chip with integrated FM and Bluetooth radios may enable a low noise FM phase-locked loop (PLL) that may minimize the 32

KHz clock noise and/or the large phase noise that may occur. In this regard, the FM PLL may utilize a narrow loop bandwidth, for example.

In another embodiment of the invention, the single chip with integrated FM and Bluetooth radios may disable at least a portion of the analog circuitry in the FM radio and/or the Bluetooth radio when performing digital processing. Disabling analog circuitry provides a reduction in the amount of power consumed by the single chip.

In another embodiment of the invention, the single chip with integrated FM and Bluetooth radios may be enabled to support high definition (HD) radio systems. In HD radio systems, the broadcasters may utilize digital signals to transmit existing analog AM and FM signals. In this regard, the analog AM and FM signals may be transmitted simultaneously and the use of digital channels may result in higher quality audio and a more robust signal. In first generation HD radio systems, services such as Main Program Service or Station Reference Service may be provided. Other services that may be supported for HD radio in the single chip may be requests for audio presentation of news, weather, entertainment, and/or stocks, for example. Additional services may comprise navigational products or applications, such as traffic information, for example, time-shifted listening, mobile commerce and advertisement, Internet-based broadcasts, and/or reading services for the visually impaired.

In an exemplary embodiment of the invention, an FM receiver front-end may receive a combined signal, which may comprise an on frequency signal or a desired signal and an interfering signal. In some instances, neither the desired signal nor the interfering signal may be dominant. In other instances, the desired signal may be dominant but it may be characterized by a low signal-to-noise ratio (SNR) if the interfering signal is on the same band.

Figure 4A:
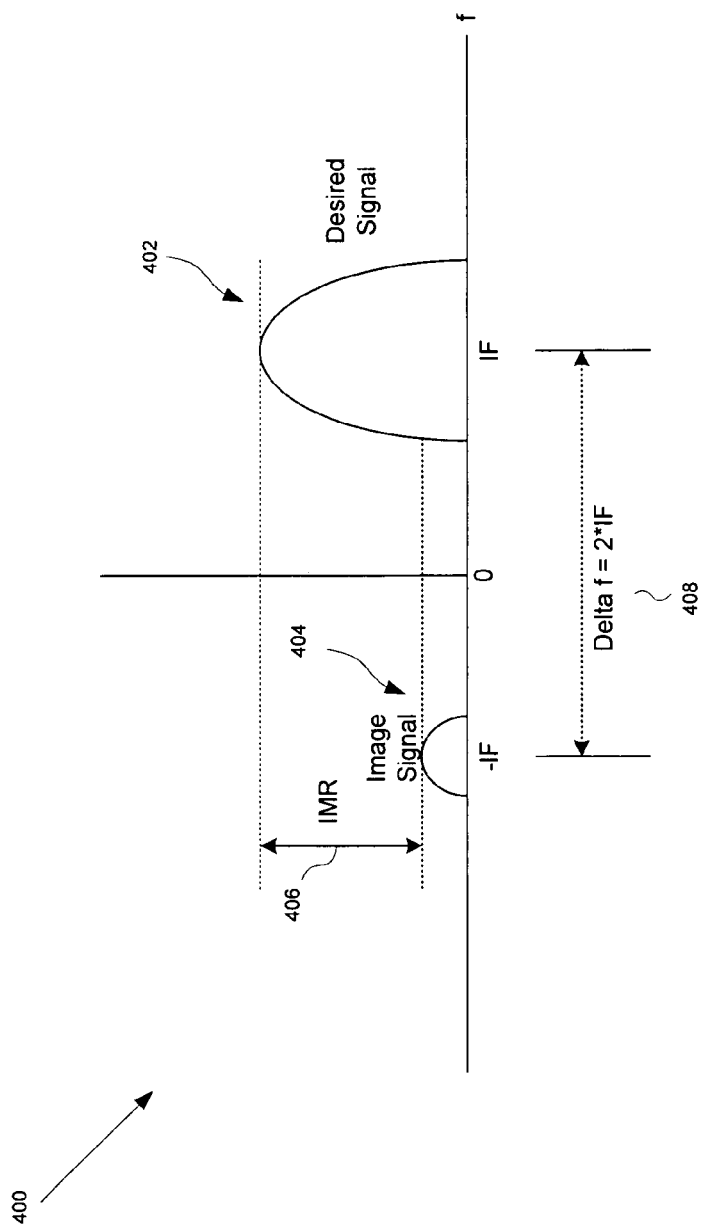
FIG. 4A is a graph illustrating an exemplary on frequency channel and a corresponding image channel, in accordance with an embodiment of the invention.

FIG. 4A is a graph illustrating an exemplary on frequency channel and a corresponding image channel, in accordance with an embodiment of the invention. Referring to FIG. 4A, the graph 400 illustrates the location of a desired frequency channel 402 and a corresponding image channel 404. The desired frequency channel 402 may be centered at the intermediate frequency (IF) and the corresponding image channel 404 may be centered at frequency (−IF). In instances where the image channel 404 is detected, it may be rejected utilizing image rejection (IMR) techniques. In this regard, the image channel 404 may be rejected by an IMR measure of 406. In an exemplary embodiment of the invention, a dynamically adjustable IF may be utilized to determine whether a particular frequency channel, such as channel 404, comprise an image channel. A frequency error may be detected in channel 404 and it may be determined that channel 404 comprises an image channel. In instances when a higher IF frequency is selected, the distance delta f 408, or Δf, may increase.

If delta f 408 increases, the image channel 404 may move away, or may shift to the left. Consequently, if the image channel 404 is detected and shifted by a determined offset, the image channel 404 may be further suppressed by utilizing, for example, a band pass filter. In another embodiment of the invention, after the image channel 404 is detected, high-side, low-side rejection may be utilized to flip the image channel 404 from one side to the other. In this regard, a high and low local oscillator frequency may be utilized with the desired frequency channel 402 to flip the current image channel 404 on the other side of the desired signal 402. The flipping of the image channel 404 may result in the image channel rejection or a significant reduction of the image channel magnitude.

In one embodiment of the invention, delta f 408 may be very small and the desired frequency channel 402 and the image channel 404 may be located close to each other. In addition, neither the desired frequency channel 402 nor the corresponding image channel 404 may be dominant. In this regard, it may be difficult to detect the image channel 404 by utilizing an IF frequency that results in an offset of the image channel 404.

Figure 4B:
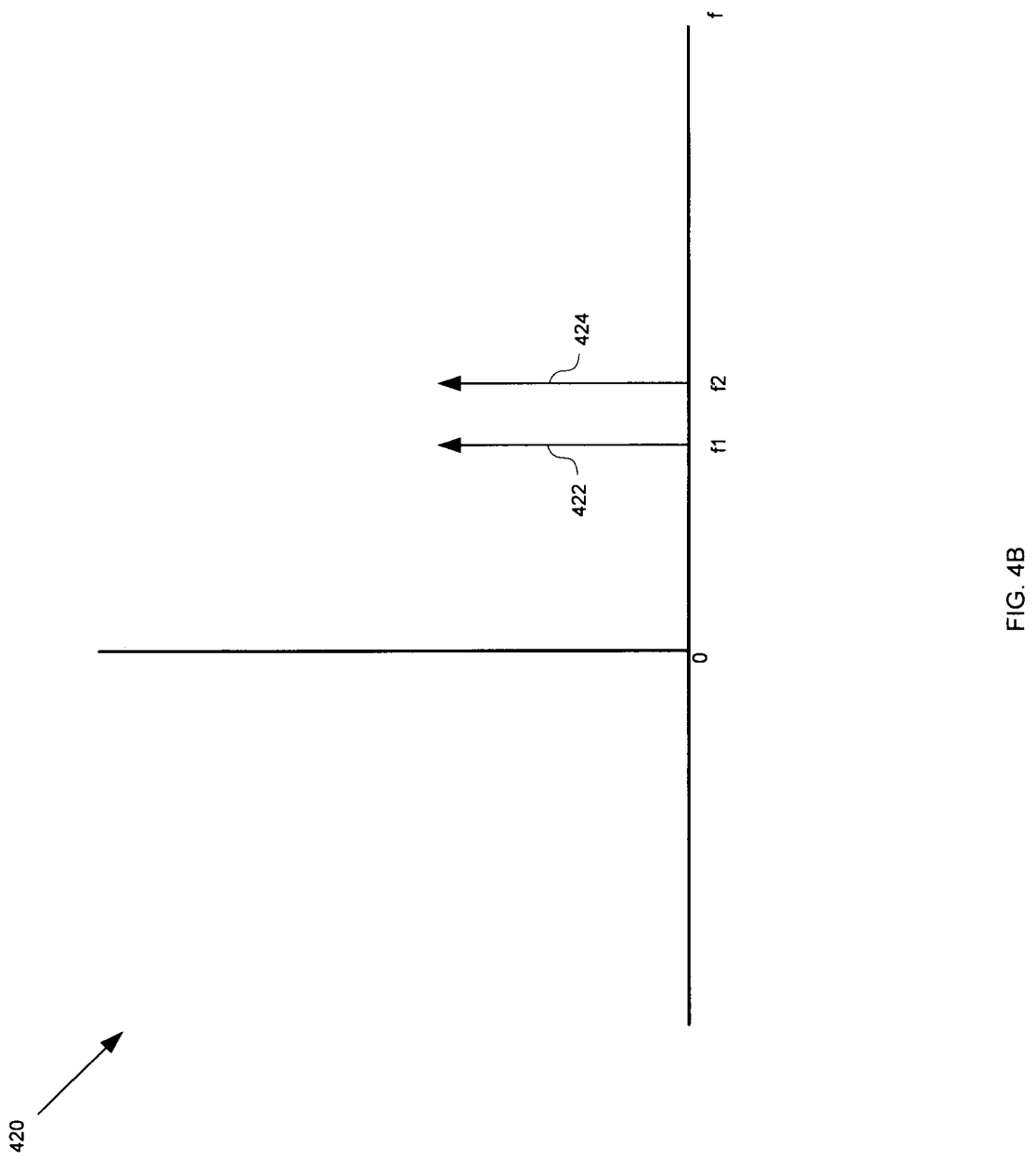
FIG. 4B is a graph illustrating a combined signal comprising two neighboring signals, in accordance with an embodiment of the invention.

FIG. 4B is a graph illustrating a combined signal comprising two neighboring signals, in accordance with an embodiment of the invention. Referring to FIG. 4B, graph 420 illustrates signals 422 and 424, which may be characterized by frequencies f1 and f2, respectively. In one embodiment of the invention, an FM receiver such as the FM receiver 110 in FIG. 1B, may tune on a signal envelope or a combined signal comprising the signals 422 and 424. Signal 424 may comprise an on frequency or a desired signal, and signal 422 may comprise a separate interfering signal. The signal 422 may also comprise an image channel corresponding to the desired signal 424.

In one embodiment of the invention, the FM receiver may receive the combined signal comprising signals 422 and 424 and may be enabled to determine whether the combined signal comprises an interfering signal, such as signal 422. Interfering signal 422 may be detected by determining fluctuations in power in the signal envelope by removing a DC component from the signal envelope and comparing the original signal envelope to the modified signal envelope. After the interfering signal 422 is detected, the FM receiver may further process the received signal envelope to mitigate the effects of the interfering signal 422.

Figure 5:
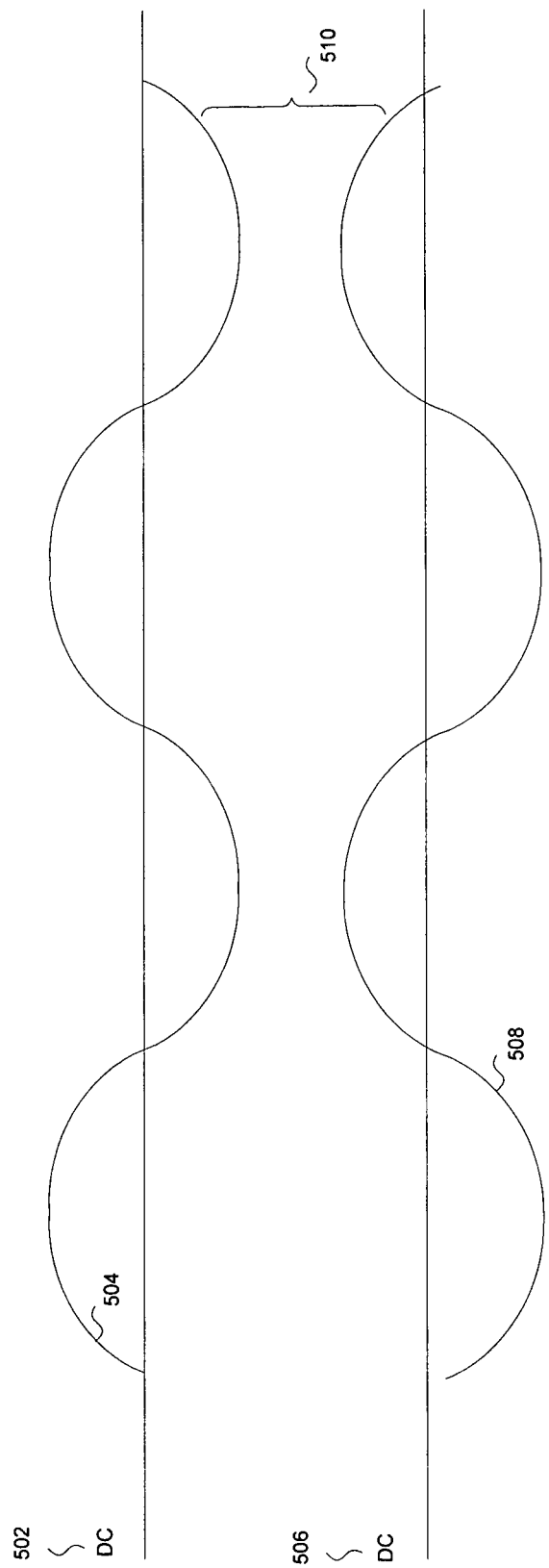
FIG. 5 is a graph illustrating a signal envelope, in accordance with an embodiment of the invention.

FIG. 5 is a graph illustrating a signal envelope, in accordance with an embodiment of the invention. Referring to FIG. 5, the signal envelope 510 may characterize a frequency beat between the two signals 504 and 508. For in-band or on-channel signals, the two sine waves of signals 504 and 508 may be located in the band of an on frequency signal. The sine wave signals 504 and 508 may be centered at DC levels 502 and 506, and may be characterized by frequencies f1 and f2, respectively. In this regard, the frequency beat 510 between the two signals 504 and 508 may correspond to the difference in frequencies (f1−f2). If the signal envelope 510 of the two sine waves 504 and 508 may be detected, it may be determined whether the signal envelope 510 comprises an interfering signal by determining fluctuations in power in the signal envelope 510 by removing the DC components 502 and 506 from the signal envelope and comparing the original signal envelope 510 to the modified signal envelope. In this regard, the comparison may be used as an interference detector so that an FM receiver, for example, may lock on to the desired signal.

Figure 6:
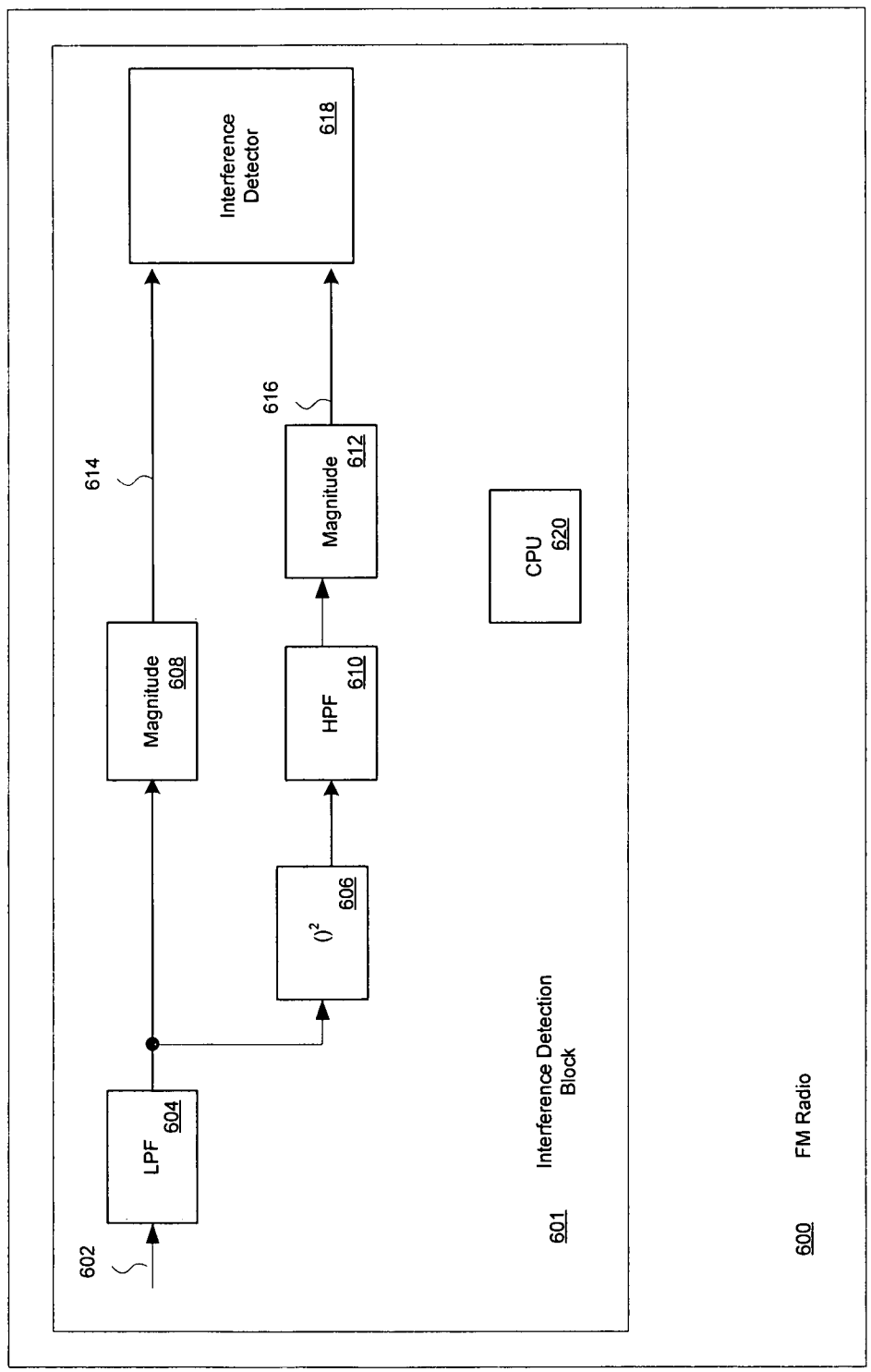
FIG. 6 is a block diagram of an exemplary interference detection block utilizing magnitude measurements, in accordance with an embodiment of the invention.

FIG. 6 is a block diagram of an exemplary interference detection block utilizing magnitude measurements, in accordance with an embodiment of the invention. Referring to FIG. 6, there is illustrated an exemplary FM radio 600. The FM radio 600 may comprise an interference detection block 601. The interference detection block 601 may comprise a CPU 620, a low-pass filter 604, a squared value determination block (SVDB) 606, magnitude determination blocks 612, a high-pass filter 610, and an interference detector 618.

The low-pass filter 604 may comprise suitable circuitry, logic, and/or code and may filter high frequencies from a received signal envelope 602. The SVDB 606 may comprise suitable circuitry, logic, and/or code and may enable receiving of a filtered signal and may perform a squared value operation. The high-pass filter 610 may comprise suitable circuitry, logic, and/or code and may enable removal of a DC component from a received signal envelope. The magnitude determination blocks 608 and 612 may comprise suitable circuitry, logic, and/or code and may determine a magnitude of a received signal. The interference detector block 618 may comprise suitable circuitry, logic, and/or code and may be enable detection of an interfering signal within a signal envelope, based on fluctuations in power and/or signal strength of a signal envelope and a modified signal envelope with a removed DC component. The CPU 620 may comprise suitable circuitry, logic, and/or code and may coordinate processing tasks within the interference detection block 601.

In operation, a signal envelope 602 may be communicated to the low-pass filter 604. The signal envelope 602 may comprise a desired signal and an interfering signal, such as signals 422 and 424 in FIG. 4B. The low-pass filter 604 may filter the signal envelope and may communicate the filtered signal envelope to the SVDB 606 and the magnitude detection block 608. The magnitude detection block 608 may measure the magnitude 614 of the received signal envelope 602 and may communicate the measured magnitude 614 to the interference detector block 618.

The SVDB 606 may perform a squared value operation with the filtered signal envelope received from the low-pass filter 604. The high-pass filter 610 may filter the resulting signal envelope from the squared value operation. In this regard, the high-pass filter 610 may remove the DC component of the signal envelope received form the SVDB 606 to generate a modified signal envelope. The modified signal envelope may be communicated to the magnitude detection block 612 and the magnitude detection block may determine the magnitude 616 of the modified signal envelope. The magnitude 616 may then be communicated to the interference detector block 618. In an exemplary embodiment of the invention, the SVDB 606 may be replaced by an absolute value block that calculates an absolute value of an input signal.

The interference detector block 618 may determine whether the signal envelope 602 comprises an interfering signal utilizing the determined magnitudes 614 and 616. For example, the interference detector block 618 may determine a ratio of Magnitude 616

$$\frac{\text{Magnitude 616}}{\text{Magnitude 614}}.$$

The determined ratio may then be compared to a threshold value. If the determined ratio $$\frac{\text{Magnitude 616}}{\text{Magnitude 614}} > \text{THRESHOLD},$$

it may be determined that the received signal envelope 602 comprises an interfering signal.

Figure 7:
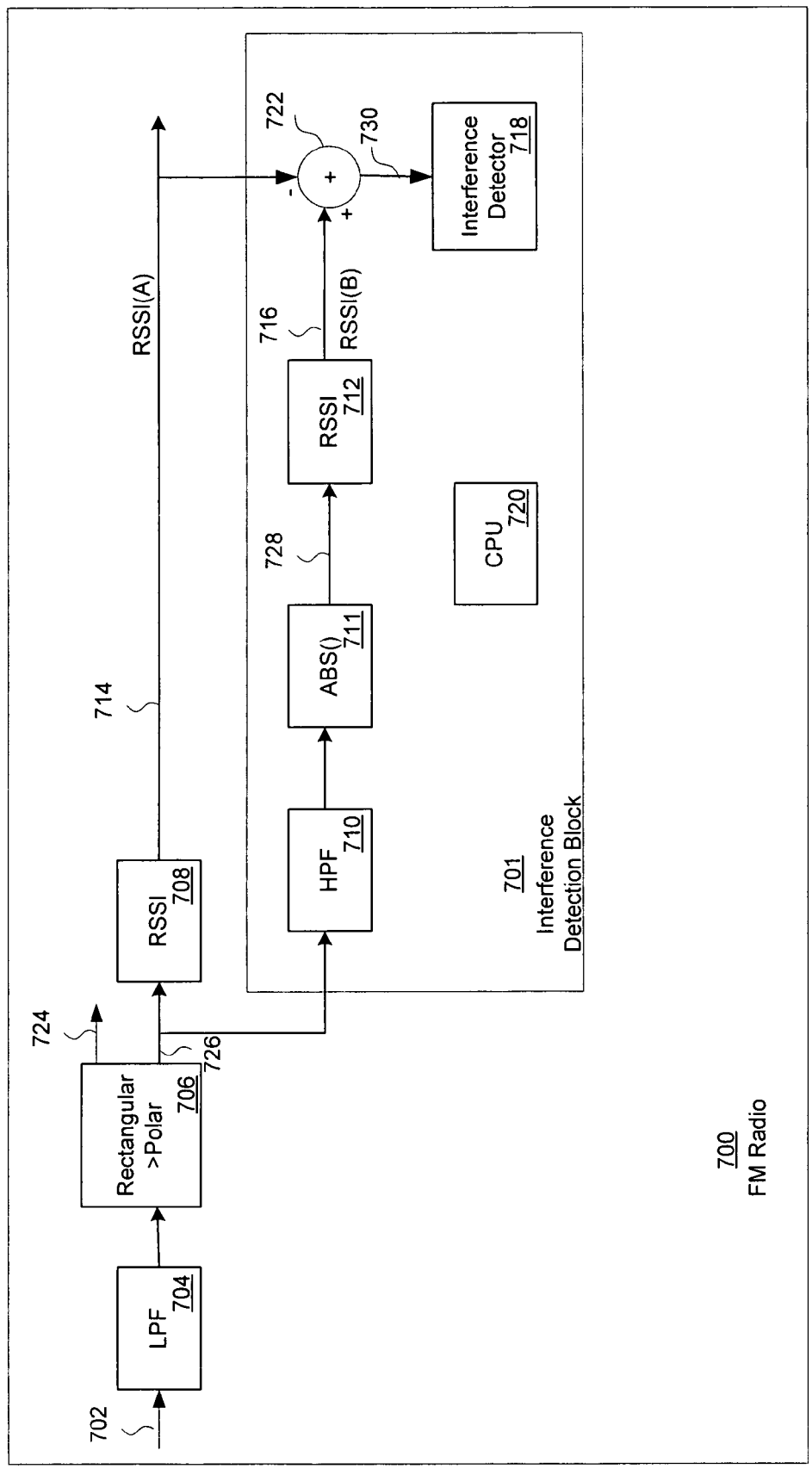
FIG. 7 is a block diagram of an exemplary interference detection block utilizing received signal strength indicator (RSSI) measurements, in accordance with an embodiment of the invention.

FIG. 7 is a block diagram of an exemplary interference detection block utilizing received signal strength indicator (RSSI) measurements, in accordance with an embodiment of the invention. Referring to FIG. 7, there is illustrated an exemplary FM radio 700. The FM radio 700 may comprise an interference detection block 701, a low-pass filter (LPF) 704, a rectangular-to-polar conversion block (RPCB) 706, and a received signal strength indicator (RSSI) detection block 708. The interference detection block 701 may comprise a CPU 720, an absolute value block (AVB) 711, an RSSI detection block 712, a high-pass filter (HPF) 710, an adder 722, and an interference detector 718.

The LPF 704 may comprise suitable circuitry, logic, and/or code and may filter high frequencies from a received signal 702. The received signal 702 may comprise, for example, a desired signal with frequency f1 and an interfering signal with a frequency f2.

The RPCB 706 may comprise suitable circuitry, logic, and/or code and may be enabled to convert an in-phase (I) and a quadrature (Q) component of the low-pass filtered signal to an angle output 724 and a magnitude output 726.

The AVB 711 may comprise suitable circuitry, logic, and/or code and may be enabled to receive a filtered signal and perform an absolute value operation. The HPF 710 may comprise suitable circuitry, logic, and/or code and may enable removal of a DC component from a received signal. The RSSI determination blocks 708 and 712 may comprise suitable circuitry, logic, and/or code and may determine signal strength of a received signal. The interference detector block 718 may comprise suitable circuitry, logic, and/or code and may enable detection of an interfering signal within a signal envelope, based on fluctuations in power and/or signal strength of a signal envelope and a modified signal envelope with a removed DC component. The CPU 720 may comprise suitable circuitry, logic, and/or code and may coordinate processing tasks within the interference detection block 701.

In operation, a signal 702 may be communicated to the LPF 704. The signal 702 may comprise a desired signal and an interfering signal, such as signals 422 and 424 in FIG. 4B. The LPF 704 may filter the signal and may communicate the filtered signal to the RPCB 706. The RPCB 706 may then generate a magnitude signal 726, which may be communicated to the RSSI determination block 708 and to the HPF 710. The RSSI detection block 708 may measure the signal strength of the received signal 702 and may communicate the measured signal strength, or RSSI (A) 714, to adder 722.

The resulting magnitude signal 726 may also be filtered by the HPF 710. In this regard, the HPF 710 may remove the DC component of the magnitude signal 726 received form the RPCB 706 to generate a modified signal. The modified signal may be communicated to the AVB 711. The AVB 711 may determine an absolute value of the communicated high-pass filtered signal to generate a modified signal envelope 728. The modified signal envelope 728 may be communicated to the RSSI detection block 712. The RSSI detection block 712 may determine the signal strength, or RSSI (B) 716 of the modified signal envelope 728. The RSSI (B) 716 may then be communicated to the adder 722. The adder 722 may determine the difference (RSSI (B)-RSSI (A)) 730 and may calculate communicate the difference 730 to the interference detector block 718.

The interference detector block 718 may determine whether the signal envelope 702 comprises an interfering signal utilizing the determined signal strength indicators RSSI (A) 714 and RSSI (B) 716. For example, the interference detector block 718 may determine whether the difference (RSSI (B)–RSSI (A)) 730 is greater than a threshold value. If the difference 730 is greater than the threshold value, it may be determined that the received signal 702 comprises an interfering signal.

In instances when f1 and f2 are far apart, RSSI (A) 714 may be larger than RSSI (B) 716. In instances when f1 is close to f2, the values of RSSI (A) 714 and RSSI (B) 716 may be close to each other. In one embodiment of the invention, FM interference detection may be used in search algorithms used in FM radios. For example, the difference between RSSI (B) and RSSI (A) may be calculated for a plurality of tuning points during the search. A frequency channel may then be selected from a plurality of allocated FM channels based on a lowest difference between RSSI (B) and RSSI (A); as such lowest difference may indicate a lowest interfering signal.

Figure 8:
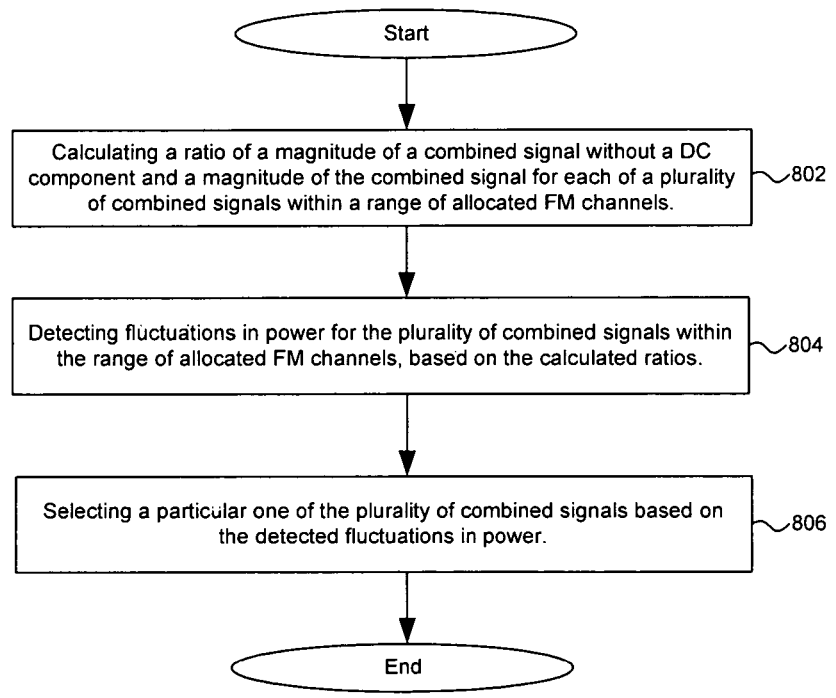
FIG. 8 is a flow diagram that illustrates exemplary steps for selecting a particular combined signal from a plurality of combined signals, in accordance with an embodiment of the invention.

FIG. 8 is a flow diagram that illustrates exemplary steps for selecting a particular combined signal from a plurality of combined signals, in accordance with an embodiment of the invention. Referring to FIGS. 6 and 8, at 802, the interference detector 618 may calculate a ratio of a magnitude 616 of a combined signal without a DC component and a magnitude 614 of the combined signal for each of a plurality of combined signals within a range of allocated FM channels. At 804, the FM radio 600 may detect fluctuations in power for the plurality of combined signals 602 within the range of allocated FM channels, based on the calculated ratios. At 806, the FM radio 600 may select a particular one of the plurality of combined signals based on the detected fluctuations in power.

Figure 9:
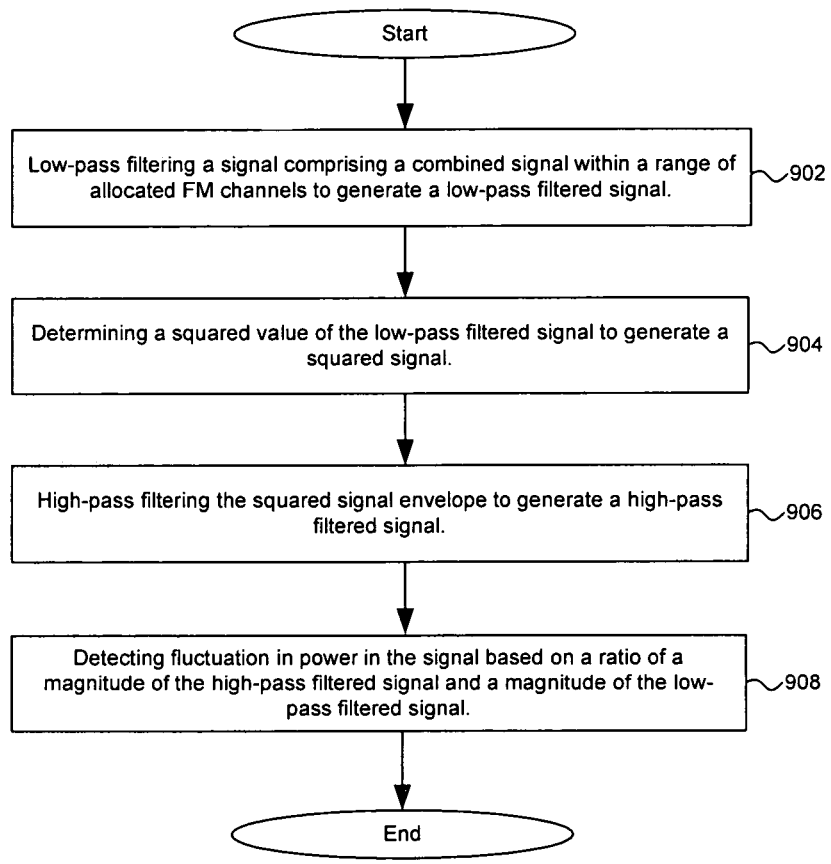
FIG. 9 is a flow diagram that illustrates exemplary steps for processing of signals, in accordance with an embodiment of the invention.

FIG. 9 is a flow diagram that illustrates exemplary steps for processing of signals, in accordance with an embodiment of the invention. Referring to FIGS. 6 and 9, at 902, the LPF 604 within the FM radio 600 may low-pass filter a signal 602 comprising a combined signal within a range of allocated FM channels to generate a low-pass filtered signal envelope. The range of allocated FM channels may vary depending on location. For example, in the Unites States of America, the range of allocated FM channels is 88-108 MHz. Each channel in the range of allocated FM channels is spaced 100 KHz apart.

At 904, a squared value of the low-pass filtered signal may be determined by the SVDB 606 to generate a squared signal. At 906, the HPF 610 may high-pass filter the squared signal to generate a high-pass filtered signal. At 908, the interference detector 618 may detect fluctuation in power in the signal 602 based on a ratio of a magnitude 616 of the high-pass filtered signal and a magnitude 614 of the low-pass filtered signal.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
low-pass filtering a signal envelope to generate a low-pass filtered signal envelope;
modifying the low-pass filtered signal envelope to generate a modified signal envelope;
determining a magnitude of the low-pass filtered signal envelope and a magnitude of the modified signal envelope; and
detecting an interference signal based on a ratio of the magnitude of the low-pass filtered signal envelope and the magnitude of the modified signal envelope.

2. The method according to claim 1, wherein modifying the low-pass filtered signal envelope comprises high-pass filtering the low-pass filtered signal envelope.

3. The method according to claim 2, wherein modifying the low-pass filtered signal envelope further comprises, before the high-pass filtering, squaring the low-pass filtered signal envelope.

4. The method according to claim 1, wherein detecting the interference signal further comprises comparing the ratio to a predetermined threshold.

5. The method according to claim 1, further comprising:
low-pass filtering a second signal envelope to generate a second low-pass filtered signal envelope;
modifying the second low-pass filtered signal envelope to generate a second modified signal envelope;
determining a magnitude of the second low-pass filtered signal envelope and a magnitude of the second modified signal envelope; and
detecting a second interference signal based on a ratio of the magnitude of the second low-pass filtered signal envelope and the magnitude of the second modified signal envelope.

6. The method according to claim 5, further comprising selecting a frequency channel based on a difference between the interference signal and the second interference signal.

7. The method according to claim 6, wherein the frequency channel is selected from within a range of allocated frequency modulation (FM) channels.

8. The method according to claim 1, wherein:
the low-pass filtering comprises low pass filtering a plurality of signal envelopes within a range of allocated frequency modulation (FM) channels to generate a plurality of low-pass filtered signal envelopes;
the modifying comprises modifying the plurality of low-pass filtered signal envelopes to generate a plurality of modified signal envelopes; and
the detecting comprises detecting interference within the range of allocated FM channels based on ratios of magnitudes of the plurality of low-pass filtered signal envelopes and magnitudes of the plurality of modified signal envelopes.

9. A system, comprising:
a low-pass filter that filters a signal envelope to generate a low-pass filtered signal envelope;
a high-pass filter that filters the low-pass filtered signal envelope to generate a modified signal envelope;
a magnitude detector that determines a magnitude of the low-pass filtered signal envelope and a magnitude of the modified signal envelope; and
an interference detector that detects an interference signal based on a ratio of the magnitude of the low-pass filtered signal envelope and the magnitude of the modified signal envelope.

10. The system according to claim 9, further comprising a squared value determiner that squares the low-pass filtered signal envelope.

11. The system according to claim 9, wherein the interference detector further compares the ratio to a predetermined threshold.

12. The system according to claim 9, wherein:
the low-pass filter further filters a second signal envelope to generate a second low-pass filtered signal envelope;
the high-pass filter further filters the second low-pass filtered signal envelope to generate a second modified signal envelope;
the magnitude detector further determines a magnitude of the second low-pass filtered signal envelope and a magnitude of the second modified signal envelope; and
the interference detector further detects a second interference signal based on a ratio of the magnitude of the second low-pass filtered signal envelope and the magnitude of the second modified signal envelope.

13. The system according to claim 12, further comprising a radio that selects a frequency channel based on a difference between the interference signal and the second interference signal.

14. The system according to claim 13, wherein the frequency channel is selected from within a range of allocated frequency modulation (FM) channels.

15. The system according to claim 9, wherein:
the low-pass filter filters a plurality of signal envelopes within a range of allocated frequency modulation (FM) channels to generate a plurality of low-pass filtered signal envelopes;
the high-pass filter filters the plurality of low-pass filtered signal envelopes to generate a plurality of modified signal envelopes; and
the interference detector detects interference within the range of allocated FM channels based on ratios of magnitudes of the plurality of low-pass filtered signal envelopes and magnitudes of the plurality of modified signal envelopes.

16. A non-transitory machine-readable storage that stores a program thereon that, when executed by a processing circuit, directs the processing circuit to perform a method, comprising:
low-pass filtering a signal envelope to generate a low-pass filtered signal envelope;
modifying the low-pass filtered signal envelope to generate a modified signal envelope;
determining a magnitude of the low-pass filtered signal envelope and a magnitude of the modified signal envelope; and
detecting, by the processing circuit, an interference signal based on a ratio of the magnitude of the low-pass filtered signal envelope and the magnitude of the modified signal envelope.

17. The non-transitory machine-readable storage of claim 16, wherein modifying the low-pass filtered signal envelope comprises high-pass filtering the low-pass filtered signal envelope.

18. The non-transitory machine-readable storage of claim 17, wherein modifying the low-pass filtered signal envelope further comprises, before the high-pass filtering, squaring the low-pass filtered signal envelope.

19. The non-transitory machine-readable storage of claim 16, the method further comprising:
low-pass filtering a second signal envelope to generate a second low-pass filtered signal envelope;
modifying the second low-pass filtered signal envelope to generate a second modified signal envelope;
determining a magnitude of the second low-pass filtered signal envelope and a magnitude of the second modified signal envelope; and
detecting a second interference signal based on a ratio of the magnitude of the second low-pass filtered signal envelope and the magnitude of the second modified signal envelope.

20. The non-transitory machine-readable storage of claim 19, the method further comprising selecting a frequency channel based on a difference between the interference signal and the second interference signal.

21. A system, comprising:
a low-pass filter that filters a signal envelope to generate a low-pass filtered signal envelope;
a high-pass filter that filters the low-pass filtered signal envelope to generate a modified signal envelope;
a magnitude detector that determines a magnitude of the low-pass filtered signal envelope and a magnitude of the modified signal envelope; and
an interference detector that detects an interference signal based on the magnitude of the low-pass filtered signal envelope and the magnitude of the modified signal envelope.

22. The system according to claim 21, wherein:
the low-pass filter filters a plurality of signal envelopes within a range of allocated frequency modulation (FM) channels to generate a plurality of low-pass filtered signal envelopes;
the high-pass filter filters the plurality of low-pass filtered signal envelopes to generate a plurality of modified signal envelopes; and
the interference detector detects interference within the range of allocated FM channels based on magnitudes of the plurality of low-pass filtered signal envelopes and magnitudes of the plurality of modified signal envelopes.

23. A method, comprising:
low-pass filtering a signal envelope to generate a low-pass filtered signal envelope;
modifying the low-pass filtered signal envelope to generate a modified signal envelope;
determining a magnitude of the low-pass filtered signal envelope and a magnitude of the modified signal envelope; and
detecting an interference signal based on the magnitude of the low-pass filtered signal envelope and the magnitude of the modified signal envelope.

24. The method according to claim 23, wherein:
the low-pass filtering comprises low pass filtering a plurality of signal envelopes within a range of allocated frequency modulation (FM) channels to generate a plurality of low-pass filtered signal envelopes;
the modifying comprises modifying the plurality of low-pass filtered signal envelopes to generate a plurality of modified signal envelopes; and
the detecting comprises detecting interference within the range of allocated FM channels based on ratios of magnitudes of the plurality of low-pass filtered signal envelopes and magnitudes of the plurality of modified signal envelopes.

25. A system, comprising:
a low-pass filter that filters a signal envelope to generate a low-pass filtered signal envelope;
a high-pass filter that filters the low-pass filtered signal envelope to generate a modified signal envelope;

a received signal strength indicator that measures a strength of the low-pass filtered signal envelope and a strength of the modified signal envelope; and an interference detector that detects an interference signal based on a difference between the strength of the low-pass filtered signal envelope and the strength of the modified signal envelope.

26. The system according to claim 25, wherein:

the low-pass filter further filters a second signal envelope to generate a second low-pass filtered signal envelope;

the high-pass filter further filters the second low-pass filtered signal envelope to generate a second modified signal envelope;

the received signal strength indicator further measures a strength of the second low-pass filtered signal envelope and a strength of the second modified signal envelope; and the interference detector further detects a second interference signal based on a difference between the strength of the second low-pass filtered signal envelope and the strength of the second modified signal envelope.

27. The system according to claim 26, further comprising a radio that selects a frequency channel based on a difference between the interference signal and the second interference signal.

* * * * *